United States Patent [19]

Matsubara

[11] Patent Number: 5,798,955

[45] Date of Patent: Aug. 25, 1998

[54] HIGH-SPEED DIVISION AND SQUARE ROOT CALCULATION UNIT

[75] Inventor: Gensoh Matsubara, Tokyo, Japan

[73] Assignee: Kabushiki Kaisha Toshiba, Kawasaki, Japan

[21] Appl. No.: 571,718

[22] Filed: Dec. 13, 1995

[30] Foreign Application Priority Data

Dec. 15, 1994 [JP] Japan .................. 6-312238
Jul. 17, 1995 [JP] Japan .................. 7-180141
Dec. 7, 1995 [JP] Japan .................. 7-319304

[51] Int. Cl.$^6$ .................. G06F 7/38; G06F 7/52
[52] U.S. Cl. .................. 364/736.01; 364/748.06; 364/752; 364/761
[58] Field of Search .................. 364/736.01, 748.06, 364/748.1, 751, 752, 761, 764–767

[56] References Cited

U.S. PATENT DOCUMENTS

| | | | |
|---|---|---|---|
| 4,939,686 | 7/1990 | Fandrianto | 364/752 |
| 5,001,664 | 3/1991 | Makita et al. | 364/761 |
| 5,237,525 | 8/1993 | Rossbach | 364/766 |
| 5,404,324 | 4/1995 | Colon-Bonet | 364/748.06 |
| 5,638,314 | 6/1997 | Yoshida | 364/767 |

OTHER PUBLICATIONS

Majerski, "Square–Rooting Algorithms for High–Speed Digital Circuits", IEEE Transactions on Computers, vol. C–34, No. 8, pp. 724–732, Aug. 1985.

Ercegovac et al., "On-the-Fly Conversion of Redundant into Conventional Representations", IEEE Transactions on Computers, vol. C–36, No. 7, pp. 895–897, Jul. 1987.

Fandrianto, "Algorithm for High Speed Shared Radix 4 Division and Radix 4 Square-Root", pp. 73–79, IEEE 1987.

Ercegovac et al., "A Division Algorithm With Prediction of Quotient Digits", IEEE Computer Society Press, pp. 51–56, (1985).

Montuschi et al., "Reducing Iteration Time When Result Digit is Zero for Radix 2 SRT Division and Square Root with Redundant Remainders", IEEE Transactions on Computers, vol. 42(2):239–246, (1993).

Nienhaus et al., "A Parallel SRT Divider for Systolic Linear System Solvers", Electrical and Electronics Engineers, vol. 3, pp. 1361–1365 (1989).

Majerski, "Square-Rooting Algorithms for High-Speed Digital Circuits", IEEE Transactions on Computers, vol. C–34(8):724–733, (1985).

Primary Examiner—Reba I. Elmore
Assistant Examiner—Emmanuel L. Moise
Attorney, Agent, or Firm—Foley & Lardner

[57] ABSTRACT

A calculation unit speedily calculates a division or square root according to an iteration algorithm with a partial remainder expressed with the sum of a sum digit and carry digit. The calculation unit has a quotient selection logic circuit. The quotient selection logic circuit at least has an adder for adding higher three bits of the sum digit to higher three bits of the carry digit, an OR gate for providing the OR of the fourth bits of the sum and carry digits, and a quotient digit determination block for determining the next quotient digit according to the outputs of the adder and OR gate.

16 Claims, 37 Drawing Sheets

ADDITION RESULT ZERO
DETECTION SIGNAL

FIG.5
PRIOR ART

| $D_0$ | $D_1$ | $D_2$ | $Q_{-1}$ | QUOTIENT DIGIT q |
|---|---|---|---|---|
| 0 | 0 | 0 | X | +1 |
| 0 | 0 | 1 | X | +1 |
| 0 | 1 | 0 | X | +1 |
| 0 | 1 | 1 | 0 | +1 |
| 0 | 1 | 1 | +1 | -1 |
| 1 | 1 | 1 | X | 0 |
| 1 | 1 | 0 | X | -1 |
| 1 | 0 | 1 | X | -1 |
| 1 | 0 | 0 | X | -1 |

FIG.8

| $D_0$ | $D_1$ | $D_2$ | $D_X$ | QUOTIENT DIGIT q |
|---|---|---|---|---|
| 0 | 0 | 0 | 0 | 0 |
| 0 | 0 | 0 | 1 | +1 |
| 0 | 1 | 0/1 | 0/1 | +1 |
| 0 | 0/1 | 1 | 0/1 | +1 |
| 1 | 1 | 1 | 0/1 | 0 |
| 1 | 0 | 0/1 | 0/1 | -1 |
| 1 | 0/1 | 0 | 0/1 | -1 |

FIG.11

| | | n | 0123 ---- | n n+1 |
|---|---|---|---|---|
| BIT POSITION INDICATOR SIGNAL | | Pn | 0000... | 0 1 0 0... |
| QUOTIENT DIGIT | +1 | NEXT Q= | 0.QQQQ... | Q 1 0 0... |
| | | NEXT R= | 0.QQQQ... | Q 0 0 0... |
| | 0 | NEXT Q= | 0.QQQQ... | Q 0 0 0... |
| | | NEXT R= | 0.RRRR... | R 1 0 0... |
| | -1 | NEXT Q= | 0.RRRR... | R 1 0 0... |
| | | NEXT R= | 0.RRRR... | R 0 0 0... |

ROOT MULTIPLE

FIG.13

| n | 0123... | $n_{n+1}$ | |
|---|---|---|---|
| BIT POSITION INDICATOR SIGNAL | Pn 0 0 0 0 ... | 0 1 | 0 0... |
| ROOT MULTIPLE — RM(+) | 0.QQQQ... | Q 0 1 | 0... |
| ROOT MULTIPLE — RM(-) | 0.RRRR ... | R 1 1 | 0... |

FIG.20A

| $D_0$ | $D_1 \cdot D_2$ | | $D_3$ | QUOTIENT DIGIT |
|---|---|---|---|---|
| 0 | 1 | 1 | X | +1 |
| 0 | 1 | 0 | X | +1 |
| 0 | 0 | 1 | X | +1 |
| 0 | 0 | 0 | 1 | +1 |
| | | X | 0 | 0 |
| 1 | 1 | 1 | X | 0 |
| 1 | 1 | 0 | X | -1 |
| 1 | 0 | 1 | X | -1 |
| 1 | 0 | 0 | X | -1 |

"X"=DON'T CARE

FIG.20B

| $D_0$ | $D_1 \cdot D_2$ | | $D_3$ | QUOTIENT DIGIT | |
|---|---|---|---|---|---|
| | | | | SIGN | ABS. |
| 0 | 1 | 1 | X | + | 1 |
| 0 | 1 | 0 | X | + | 1 |
| 0 | 0 | 1 | X | + | 1 |
| 0 | 0 | 0 | 1 | + | 1 |
| | | X | 0 | + | 0 |
| 1 | 1 | 1 | X | + | 0 |
| 1 | 1 | 0 | X | - | 1 |
| 1 | 0 | 1 | X | - | 1 |
| 1 | 0 | 0 | X | - | 1 |

"X"=DON'T CARE

HIGH-SPEED DIVISION AND SQUARE ROOT CALCULATION UNIT

BACKGROUND OF THE INVENTION

1. Field of the Invention

The present invention relates to a calculation unit, and particularly, to a calculation unit capable of calculating divisions and square roots at high speed.

2. Description of the Prior Art

Unlike multiplications, additions, and subtractions, the arithmetic operations of divisions and square roots are calculated according to completely successive algorithms, and therefore, are unable to benefit from high-speed parallel operations. Time for calculating a division or square root is about ten times longer than that for calculating a multiplication. Many studies have been made for speeding up the division and square root calculations. Among them, a Newton-Ralphson method employing a convergent algorithm and an SRT-algorithm-based method employing an iteration algorithm are widely known. The Newton-Ralphson method requires a lot of hardware including multipliers and ROMs. Accordingly, the iteration algorithm is usually used. To improve an operation speed, the iteration algorithm uses a partial remainder of redundant form and executes a full-bit addition on the partial remainder with a high-speed carry save adder (CSA) instead of a carry propagation adder (CPA) that is slow. When determining the next quotient digit, the redundant partial remainder must be changed into a nonredundant one through a carry propagation addition whose bit length is determined according to required accuracy. If the radix of the quotient digit is 2, the bit length of the carry propagation addition will be four. Since time for executing the carry propagation addition determines an operation speed, various techniques employing 3-bit carry propagation additions have been proposed. One of the techniques holds a previous quotient digit and uses the same when selecting the next quotient digit. Another technique limits the range of divisors when calculating a division, or the range of values which correspond to the divisors and are derived from a quotient digit set when calculating a square root. The technique of holding a previous quotient digit needs a complicated device for selecting a quotient digit, to extend a delay time, and the technique of limiting the range of divisors deteriorates the generality of the calculation. Consequently, these techniques are improper to speed up the division and square root calculations.

An iteration algorithm for calculating a square root involves a quotient digit of redundant form. To provide a nonredundant root multiple, which corresponds to a multiple of a divisor of a division, according to the redundant quotient digit, a carry save adder must calculate a partial remainder in two steps because of the redundant quotient digit. In the case of a division, the carry save adder may complete a partial remainder calculation in a single step because a divisor is originally in a nonredundant form. To let the carry save adder finish the partial remainder calculation for a square root in a single step, special hardware for changing a redundant quotient digit into a nonredundant one must be employed. The technique of completing a partial remainder calculation in two steps is disadvantageous because it involves a large number of operations. The technique of employing special hardware has the problem of operation speed and additional hardware. In particular, the operation speed of the additional hardware is critical when the technique is applied to a high-speed method that estimates partial remainders according to assumed quotient digits and determines the next quotient digit accordingly.

There is a self-timed dynamic circuit that employs a plurality of dividers cascaded one after another to calculate a division. The cascaded dividers are successively operated in response to set/reset instructions that are provided at proper timing, to calculate a division at high speed. This prior art, however, is unable to calculate square roots, or square roots and divisions due to the problem of partial remainder calculation. It is important for the self-timed circuit to correctly detect the completion of a calculation. For this purpose, the prior art employs an arrangement for detecting the completion of a partial remainder calculation involving many bits. This arrangement has the problems of much hardware, a small operational margin, and difficult control.

There is a result zero detector for determining whether or not the result of an addition or subtraction is zero. FIG. 1 shows a result zero detector that provides the NOR of resultant bits of an addition or subtraction. There is another type of a result zero detector that makes a result zero determination in parallel with an addition or subtraction. The former makes a result zero determination after the completion of an addition or subtraction. Accordingly, the latter is preferable to improve an operation speed. FIG. 2 shows an example of such a result zero detector. Each n-bit CLA prepares a result zero detection signal with carry propagation and that without carry propagation, and one of the signals is selected in response to an actual carry. Time for making a result zero determination in this circuit is usually longer than time for calculating an addition or subtraction. Accordingly, the operation speed of a system consisting of an adder/subtracter plus the result zero detector is determined by the speed of the result zero detector. FIG. 3 shows a result zero detector that is not affected by carry propagation. To maintain a total operation speed, this detector allows a carry input signal to have a delay time corresponding to only a single gate. Accordingly, if a carry input signal to a least significant bit (LSB) is behind input data, the delay time of the carry input signal may limit the speed of a result zero determination. The circuit of FIG. 3 consists of exclusive OR gates cascaded one after another. The delay time of the exclusive OR gate is usually longer than that of an AND or OR gate. Accordingly, the circuit of FIG. 3 will not provide high-speed performance.

In this way, a system consisting of adders/subtracters and result zero detectors may be realized by discrete adders/subtracters and result zero detectors so that a result zero determination is made after the completion of an addition or subtraction, or by the parallel arrangement of FIG. 3 that simultaneously carries out an addition or subtraction and a result zero determination with many conditions levied on the timing of signals and the designing of the system.

These prior arts for calculating divisions or square roots employ a complicated quotient selector, to deteriorate an operation speed. In particular, the prior arts must calculate a partial remainder according to an actual quotient digit when calculating a square root. If the quotient digit is in a redundant form, a carry save addition must be carried out in two steps, or the quotient digit must be changed into a nonredundant one. The two-step operation slows the operation speed of the calculation unit compared with a division that is a one-step operation.

Changing a redundant quotient digit into a nonredundant one is achievable by a known algorithm but involves a lot of hardware and a long delay time. To let a square root calculation unit calculate a division by sharing some parts thereof, the prior arts must employ additional parts.

Although there is a known calculation unit that consists of plurality of dividers cascaded one after another with the operation timing thereof being determined in a self-timed manner, it is capable of calculating only divisions. There is no cascaded arrangement for calculating square roots, or square roots and divisions. To detect the completion of a calculation, the cascaded dividers of the prior art require a lot of hardware and allow only a scarce operational margin.

The system consisting of adders/subtracters and result zero detectors according to the prior art may provide a high operation speed if it is properly designed. The system, however, must levy restrictions on the timing of signals and the arrangement of elements. In addition, the prior art cascades exclusive OR gates whose delay time is longer than that of AND or OR gates. This may deteriorate the operation speed.

FIG. 4 shows a quotient selection logic employing a 3-bit adder according to a prior art. A partial remainder is in a redundant form and is expressed with the sum of a carry signal made of bits C1, C2, and C3 and a sum signal made of bits S0, S1, and S2. To correctly weight each bit, input terminals a0, a1, and a2 of the 3-bit adder receive the sum bits S0, S1, and S2, respectively, and input terminals b0, b1, and b2 thereof receive the carry bits C1, C2, and C3, respectively. Then, the 3-bit adder provides a sum consisting of bits D0, D1, and D2. The bit D0 indicates the sign of the partial remainder, and the bits D1 and D2 indicate the value of the partial remainder. FIG. 5 is a table showing quotient selection rules to provide a quotient digit according to the bits D0, D1, and D2. A radix 2 SRT algorithm causes a problem when a redundant partial remainder provides bits D0, D1, and D2 of 0, 1, 1, respectively. If a decimal point is between the bits D1 and D2, a value of 01.1 formed by the bits D0, D1, and D2 is equal to +1.5 at the minimum in decimal notation when all lower carry and sum bits are each 0. If these lower carry and sum bits are each 1 in the worst case, the value may be slightly greater than −1.5. Namely, the partial remainder will be in the discrete ranges of +1.5 to +2.0 and −2.0 to −1.5. To avoid this problem, the prior art employs a 4-bit carry propagation adder, or as shown in FIG. 4, a quotient digit memory in addition to the 3-bit adder, to use a previous quotient digit.

FIG. 6 is a block diagram showing a partial remainder formation block (PRF) 132 according to a prior art. The block 132 has a selector (MUX) 151 and a carry save adder (CSA) 155. The selector 151 selects a divisor digit signal or a root multiple signal, which have been prepared for assumed quotient digits, according to the sign of a quotient digit provided by the quotient selection logic of FIG. 4. The CSA 155 calculates the sum of the output of the selector 151 and the current partial remainder and provides the next partial remainder. In this way, a quotient digit is divided into a sign and an absolute value according to the quotient selection rules of FIG. 5, and the carry save adder 155 provides the next partial remainder.

Employing a 4-bit carry propagation adder further increases a delay time. The prior art of FIG. 4 deteriorates the symmetry of quotient selection rules, and in addition, requires a quotient digit memory that increases the size of the circuit.

Further, we must consider the case that wrong arithmetic results may be obtained for a specific calculation, namely the calculation in which the division is exactly divisible and completed on the way. Then, there is another drawback in the prior art as shown in FIG. 4 that further hardware components and calculation time are required to correct these wrong arithmetic results.

SUMMARY OF THE INVENTION

An object of the present invention is to provide a calculation unit capable of solving the problems of the prior arts, performing high-speed calculations, and having a simple structure.

Another object of the present invention is to provide a calculation unit that employs an overlap method for estimating the next partial remainder according to assumed quotient digits, to improve a calculation speed. The calculation unit includes a root multiple formation block that is simple and realizes high-speed square root calculations or square root and division calculations.

In order to accomplish the objects, a first aspect of the present invention provides a calculation unit of FIG. 14. This unit has a square root arithmetic data generator 44, a divisor digits memory 122, a partial remainder memory 121 for storing a sum digit and carry digit that form a partial remainder, a quotient selection logic (QSL) 123 for generating a quotient digit q according to the output of the partial remainder memory 121, a division/square root selector 125 for selecting the output of the generator 44 or the output of the memory 122, a summand selector 126 for selecting one of the outputs of the selector 125 according to the quotient digit q provided by the QSL 123, to provide data to be added to or subtracted from the partial remainder, and a carry save adder (CSA) 124 for carrying out a calculation on the data provided by the summand selector 126 and the partial remainder provided by the memory 121 according to an addition/subtraction instruction provided by the QSL 123. The output of the CSA 124 is supplied to the memory 121. The square root arithmetic data generator 44 has a bit position indicator 111 for storing the position of a bit where a quotient digit is calculated, a first quotient digits memory 112 for storing a nonredundant quotient digit set estimated on the assumption that there is carry propagation from a lower bit, a second quotient digits memory 113 for storing a nonredundant quotient digit set estimated on the assumption that there is no carry propagation from the lower bit, the PQR 114 for generating quotient digit sets according to the outputs of the elements 111, 112, and 113, and a root multiple formation block (RMF) 115 for generating data to be used for a root multiple calculation. The QSL 123 has, as shown in FIG. 7, a 3-bit adder 101 and a 2-input OR gate 102, or as shown in FIG. 19, a 3-input OR gate 162. In FIGS. 7 and 19, the QSL 123 has a quotient digit determination block 103 for selecting a quotient digit according to the outputs of the adder 101 and OR gate 102 (162).

The first aspect of the present invention also provides a calculation unit of FIG. 15. The unit has a square root arithmetic data generator 44, an overlap execution block (OVLP) 131 for estimating the next partial remainders according to assumed quotient digits, a selector (MUX) 133 for selecting one of the outputs of the OVLP 131 according to a determined quotient digit, a quotient selection logic (QSL) 123 for selecting a quotient digit according to the selected partial remainder, a divisor digits memory 122, and a partial remainder formation block (PRF) 132 for calculating a partial remainder. As shown in FIG. 18, the PRF 132 calculates values corresponding to quotient digits of +1, and +1, respectively, in advance and selects one of them according to a determined quotient digit. Thereafter, the PRF 132 adds or subtracts the selected value to or from a current partial remainder, to provide the next partial remainder.

The QSL 123 of FIG. 7 receives two numbers each made of higher four bits including a sign bit. Higher three bits of each of the numbers are used to carry out a carry propagation addition, which provides a 3-bit output. At the same time, the least significant bits (LSBs) of the two 4-bit numbers are ORed, to provide a 1-bit output. These processes provide complete information for selecting a quotient digit of a division or square root according to a radix 2 SRT algorithm. The quotient digit determination block 103 looks up quotient selection rules of FIG. 8 to determine the sign of the quotient digit according to the most significant bit (MSB) D0 of the 3-bit output of the adder 101. If all bits of the 3-bit output are each 1, the absolute value of the quotient digit is 0. If all bits of the 3-bit output are each 0 with the ORed output being 0, the absolute value of the quotient digit is 0. In the other cases, the absolute value of the quotient digit is 1. In this way, the bits D0, D1, and D2 of the output of the adder 101 and the ORed output bit Dx correctly determine the quotient digit q. This arrangement is small in number of hardware components and provides a quotient digit at high speed.

In the organization of the calculation unit including a quotient selection logic (QSL) 123 as shown in FIG. 19, the QSL 123 receives two numbers each made of higher four bits including a sign bit. Higher three bits of each of the numbers are subjected to a carry propagation addition, which provides a 3-bit output. At the same time, the LSBs of the two 4-bit numbers and the LSB of the 3-bit output are ORed by a 3-input 1-output OR gate 162, to provide a 1-bit output. These processes provide complete information for selecting a quotient digit of a division or square root according to a radix 2 SRT algorithm. A quotient digit determination block 103 determines the sign of the quotient digit according to the MSB of the 3-bit output. If all bits of the 3-bit output are each 1, or higher two bits thereof are each 0 and the ORed output is 0, the absolute value of the quotient digit is 0. In the other cases, the absolute value of the quotient digit is 1. To express the quotient digit with one of +1, 0, and +1, 0 is selected if all bits of the 3-bit output are each 1, or if higher two bits thereof are each 0 and the ORed output is 0. If the MSB of the 3-bit output is 0 and the conditions for selecting a quotient digit of 0 are not met, a quotient digit of +1 is selected. If the MSB of the 3-bit output is 1 and when the conditions for selecting a quotient digit of 0 are not met, a quotient digit of −1 is selected.

When the result of a carry propagation addition of four bits of a partial remainder is 0, utilizing the arrangement as shown in FIGS. 7 and 19, a quotient digit of 0 is selected. Namely, when a division or square root is completely divided to provide a partial remainder of 0, a quotient digit of 0 is always selected. And the problem of incorrectness of quotient, which arised in the prior art, can be neglected.

A second aspect of the present invention cascades a plurality of calculation units one after another as shown in FIG. 23. This arrangement employs bit position indicators each indicating the position of a bit where a quotient digit is calculated. It also employs on-the-fly quotient digit decoders for successively changing redundant quotient digits into nonredundant ones, or root multiple formation blocks (RMFs) for providing root multiples. This arrangement provides a quotient digit of at least two bits in a single step when calculating a division or square root. In FIG. 29, a selector (MUX) 171 selects root multiples or a divisor used for a partial remainder calculation.

In this way, the second aspect calculates a division or square root according to an iteration algorithm by successively changing redundant quotient digits into nonredundant ones. The calculation unit according to the second aspect employs an on-the-fly quotient digit decoder 46 of FIG. 9. The decoder 46 has a bit position indicator 111 for storing the position of a bit where a quotient digit is calculated with the bit in question being provided with a different value from the other bits, a first quotient digits memory 112 for storing a nonredundant quotient digit set estimated on the assumption that there is carry propagation, a second quotient digits memory 113 for storing a nonredundant quotient digit set estimated on the assumption that there is no carry propagation, and an on-the-fly digit handling block (PQR) 114 for generating the next quotient digit sets. In FIG. 23, at least two decoders 46 are cascaded one after another, to provide a quotient digit of at least two bits in a single operation.

The on-the-fly quotient digit decoder or the root multiple formation block is formed according to the fact that the position indicated by the bit position indicator changes at intervals of n at an input end of the calculation unit, if the number of bits of a quotient digit to be calculated in a single signal passage is in the range of 2 to n. Namely, there are bit positions where the indication of the bit position indicator is unchanged as shown in FIG. 23. According to this fact, redundant quotient digits are successively changed into nonredundant ones, or root multiples are generated. This arrangement requires less hardware components compared with an arrangement that assumes that the indication of the bit position indicator always changes. This idea is applicable to signals transmitted between calculation units that are cascaded one after another. Since there are bit positions where the indication of the bit position indicator is unchanged, it is possible to greatly reduce the hardware components of the on-the-fly quotient digit decoder and the root multiple formation block. The selector (MUX) 171 of FIG. 29 selects root multiples or a divisor, to calculate a square root or division by sharing hardware components. In this case, the quotient selection logic (QSL) and quotient digit determination block may employ the 3-bit adder 101 and OR gate 102 (162) of FIGS. 7 and 19 that are shared by division and square root calculations. The difference between a division and a square root is only the difference between addition/subtraction data used for calculating a partial remainder. Accordingly, these data are switched from one to another by the selector (MUX) 171, to calculate square roots and divisions in the same hardware. At this time, a quotient digit in a signed digit format, i.e., a redundant form provided by an iteration operation is changed into a nonredundant one with simple hardware. Similarly, root multiples necessary for calculating a square root are generated by simple hardware. In this way, the calculation unit of the present invention is realized by simple hardware.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 5 shows quotient selection rules used by the prior art of FIG. 4;

FIG. 8 shows quotient selection rules used by the QSL of FIG. 7;

FIG. 11 shows the operation of the PQR of FIG. 10;

FIG. 13 shows the operation of the RMF of FIG. 12;

FIG. 20A shows quotient selection rules to express each quotient digit with one of +1, 0, and −1 according to the sixth embodiment;

FIG. 20B shows quotient selection rules to express each quotient digit with a sign and an absolute value according to the sixth embodiment;

DETAILED DESCRIPTION OF THE EMBODIMENTS

Figure 1:
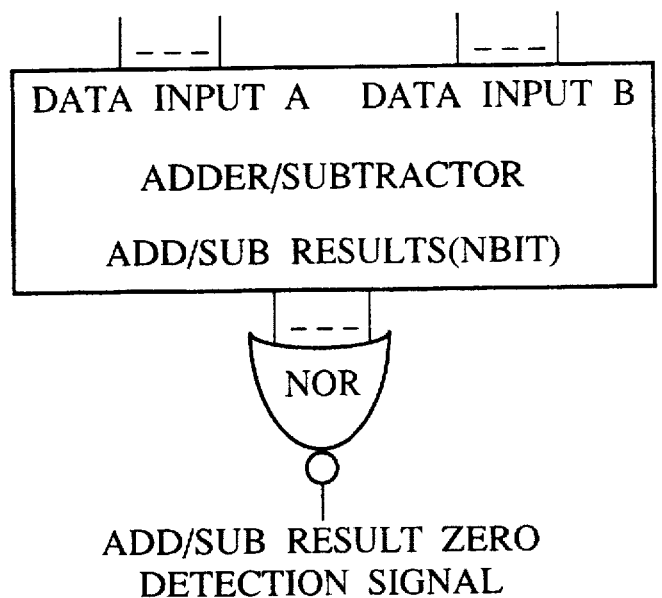
FIG. 1 shows a result zero detector for addition/subtraction, having a NOR gate according to a prior art.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

[First embodiment]

Figure 7:
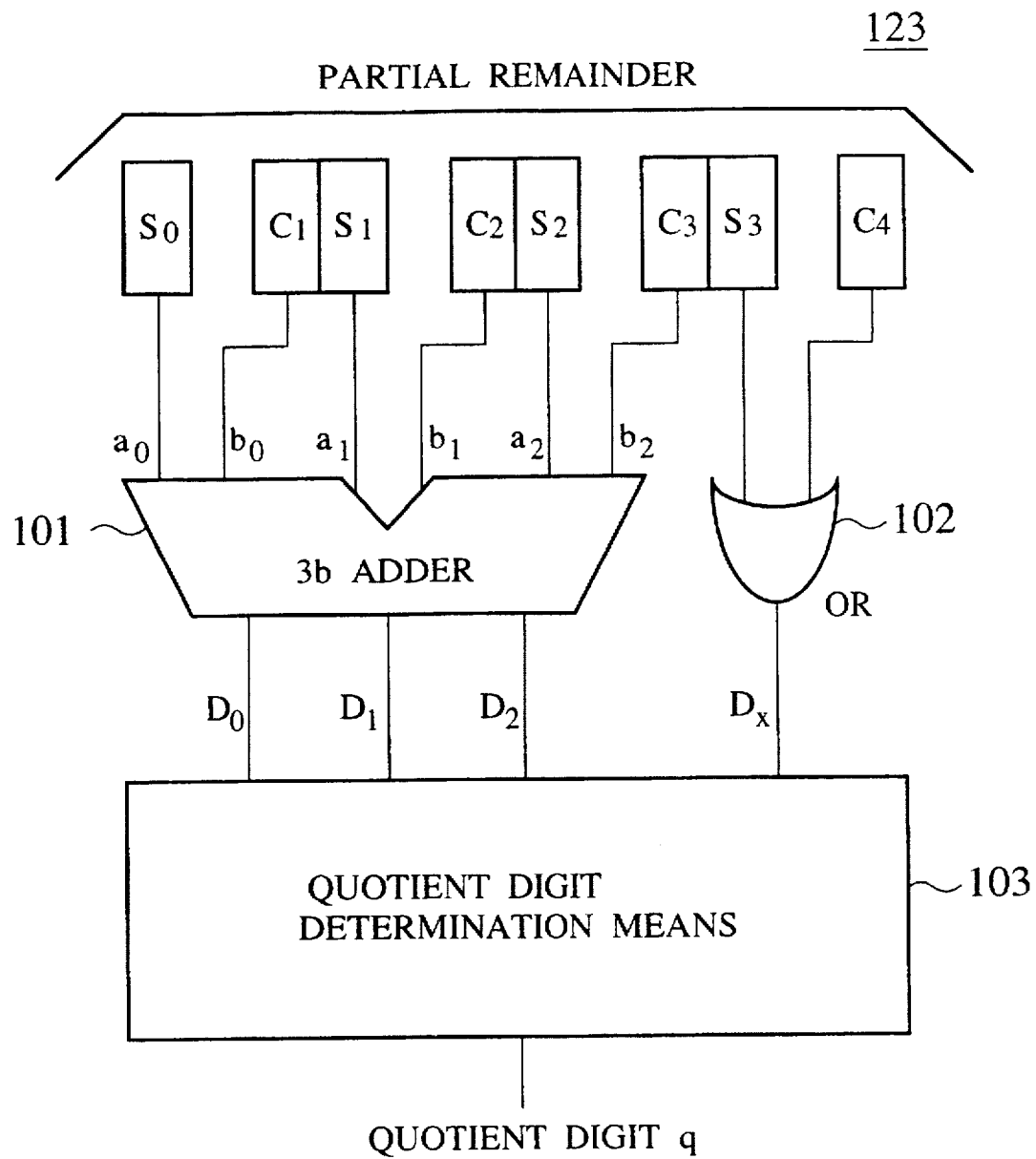
FIG. 7 shows a quotient selection logic (QSL) with a 3-bit adder and an OR gate according to a first embodiment of the present invention.

FIG. 7 is a block diagram showing a quotient selection logic (QSL) employing an iteration algorithm according to the first embodiment of the present invention. A redundant partial remainder is expressed with a carry signal having bits C1 to C4 and a sum signal having bits S0 to S3. Where S0 and C1 are the MSBs in the sum signal and carry signal of partial remainder, respectively. A 3-bit adder 101 receives two pieces of 3-bit data and provides a sum. An OR gate 102 receives two pieces of 1-bit data and provides a 1-bit OR. Input terminals a0 to a2 of the adder 101 receive the sum bits S0 to S2, respectively, and input terminals b0 to b2 thereof receive the carry bits C1 to C3, respectively. Then, the adder 101 provides a sum signal of 3 bits D0 to D2. The bit D0 represents the sign of the partial remainder, and the bits D1 and D2 represent the value of the partial remainder. The LSBs S3 and C4 are ORed into a bit Dx. The bits D0, D1, D2, and Dx are supplied to a quotient digit determination block 103, which looks up quotient selection rules of FIG. 8, to provide a quotient digit.

Figure 4:
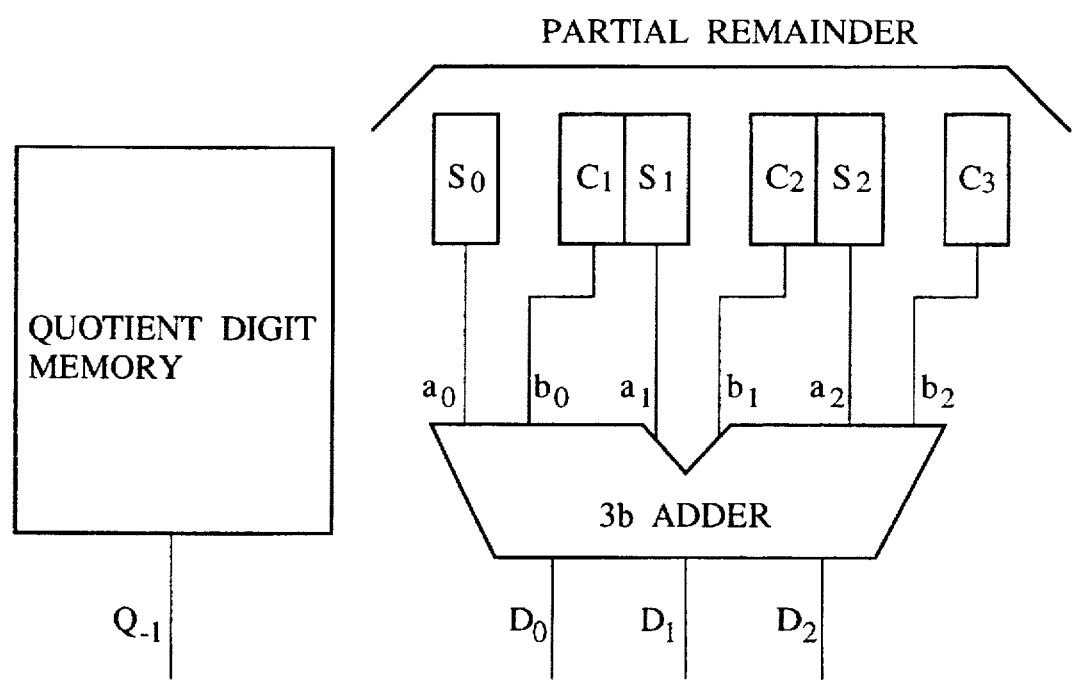
FIG. 4 shows a quotient selection logic with a 3-bit adder according to a prior art.

The redundant partial remainder according to the radix 2 SRT algorithm causes a problem when the bits D0 to D2 are 0, 1, and 1, respectively. If a decimal point is between the bits D1 and D2, a value of 01.1 formed by the bits D0, D1, and D2 is equal to +1.5 at the minimum in decimal notation when all lower carry and sum bits are each 0. If these lower carry and sum bits are each 1, the value may be slightly greater than −1.5. Namely, the partial remainder will be in the discrete ranges of +1.5 to +2.0 and −2.0 to −1.5. To avoid this problem, the prior art employs a 4-bit carry propagation adder, or as shown in FIG. 4, the quotient digit memory in addition to the 3-bit adder, to use a previous quotient digit. This prior art deteriorates the symmetry of quotient selection rules and must have the hardware for storing a previous quotient digit. The 4-bit carry propagation adder of the prior art increases a delay time.

On the other hand, the QSL of the first embodiment simply adds the OR gate 102 to the 3-bit adder 101, to maintain the symmetry of quotient selection rules and achieve a high-speed operation. As explained above, bits D0, D1, and D2 of 0, 1, and 1 will provide a new partial remainder in the range of −2.0 and −1.5, if a quotient digit of +1 is selected with respect to bits D0, D1, and D2 of each 0. Accordingly, the present invention checks the bit Dx only when the bits D0 to D2 are each 0, to test whether or not the current partial remainder is above 00.01. If it is less than 00.01, i.e., if the bit Dx is 0, a quotient digit of 0 is selected to avoid the problem. The quotient selection rules of FIG. 8 maintain symmetry.

In this way, the calculation unit having the QSL of the first embodiment receives two numbers each consisting of higher four bits including a sign bit. Higher three bits among the four bits of each of the numbers are subjected to a carry propagation addition to provide a 3-bit sum output. The LSBs of the two 4-bit numbers are ORed to provide a 1-bit output. These processes provide complete information for selecting a quotient digit of a division or square root according to the radix 2 SRT algorithm. The quotient digit determination block 103 looks up the quotient selection rules of FIG. 8 and determines the sign of the quotient digit according to the MSB of the 3-bit sum. If all bits of the 3-bit sum are each 1, 0 is selected as the absolute value of the quotient digit. If all bits of the 3-bit sum are each 0 and the OR output is 0, the absolute value of the quotient digit is 0. In the other cases, the absolute value of the quotient digit is 1. In this way, the first embodiment provides a correct quotient digit. Since the embodiment determines a quotient digit according to a 3-bit carry propagation addition and the OR of two LSBs, it reduces hardware and determines a quotient digit at high speed. And even in the case that the quotient digits are directly outputted as +1, 0, −1, the above superiority is maintained.

According to the prior art of FIG. 5, the probability of selecting a quotient digit of 0 is approximately 35%. On the other hand, the same of the present invention of FIG. 8 is approximately 43%. Namely, the present invention realizes an about 8% increase in selecting a quotient digit of 0. When a quotient digit of 0 is selected, later calculations will be very simple. Accordingly, improving the probability of selecting a quotient digit of 0 increases an operation speed.

As explained above, the first embodiment of the present invention realizes high-speed calculations with simple hardware and maintains the symmetry of quotient election rules.

[Second embodiment]

Figure 9:
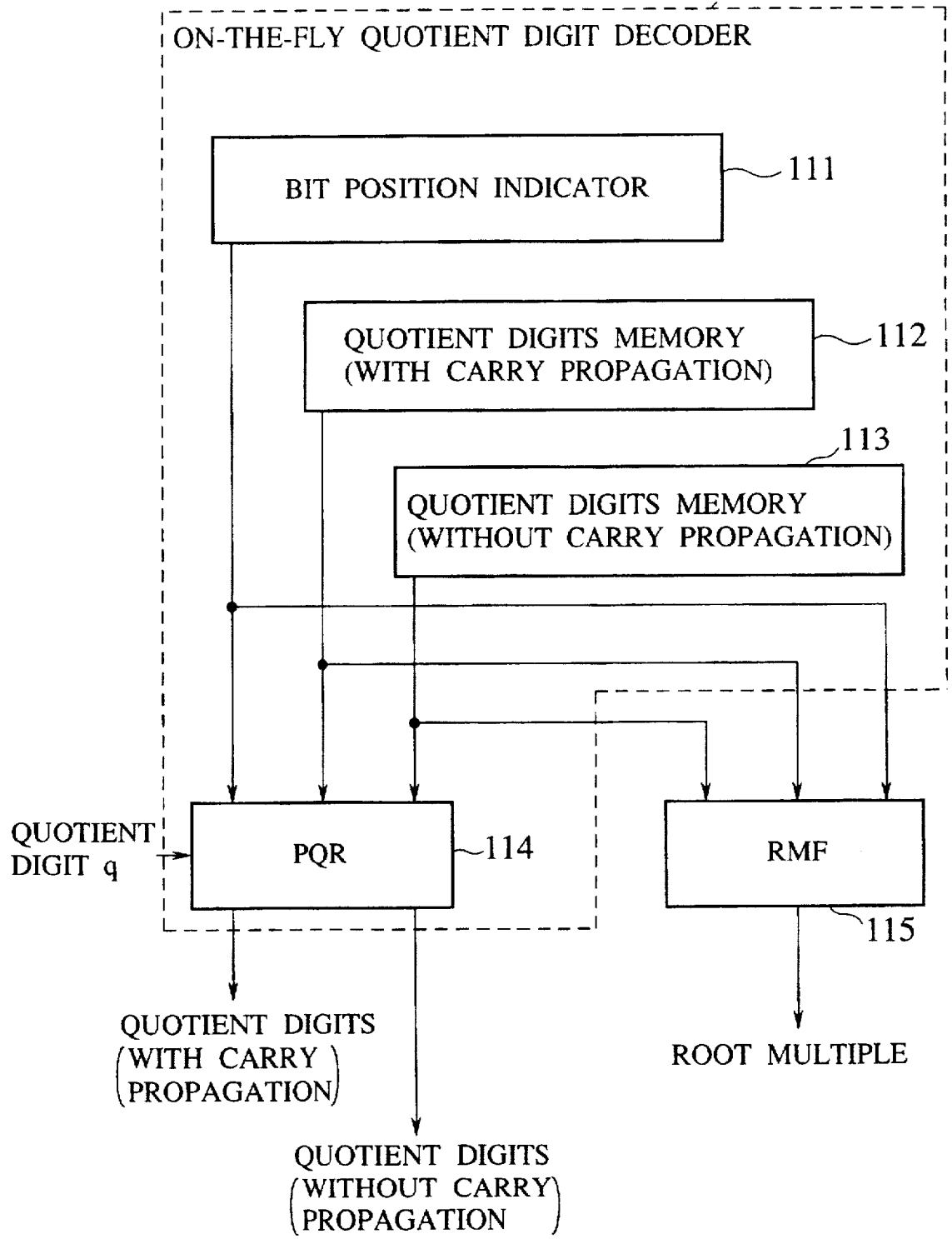
FIG. 9 shows a square root arithmetic data generator according to a second embodiment of the present invention.

FIG. 9 is a block diagram showing a square root arithmetic data generator 44 employing an iteration algorithm with a redundant quotient digit, according to the second embodiment of the present invention. The square root arithmetic data generator 44 comprising an on-the-fly quotient digit decoder 46 and a root multiple formation block (RMF) 115, and the on-the-fly quotient digit decoder 46 consists of elements 111 to 114. A bit position indicator 111 stores the position of a bit where a quotient digit is calculated. A quotient digit memory 112 stores a nonredundant quotient digit set prepared on the assumption that there is carry propagation from a lower bit. A quotient digit memory 113 stores a nonredundant quotient digit set prepared on the assumption that there is no carry propagation from the lower bit. An on-the-fly digit handling block (PQR) 114 provides quotient digit sets according to data from the elements 111, 112, and 113. A root multiple formation block (RMF) 115 generates root multiples according to data from the elements 111, 112, and 113. The square root arithmetic data generator 44 receives a redundant quotient digit "q" from the quotient selection logic (QSL) of the first embodiment and provides nonredundant quotient digit sets and nonredundant root multiples.

Figure 10:
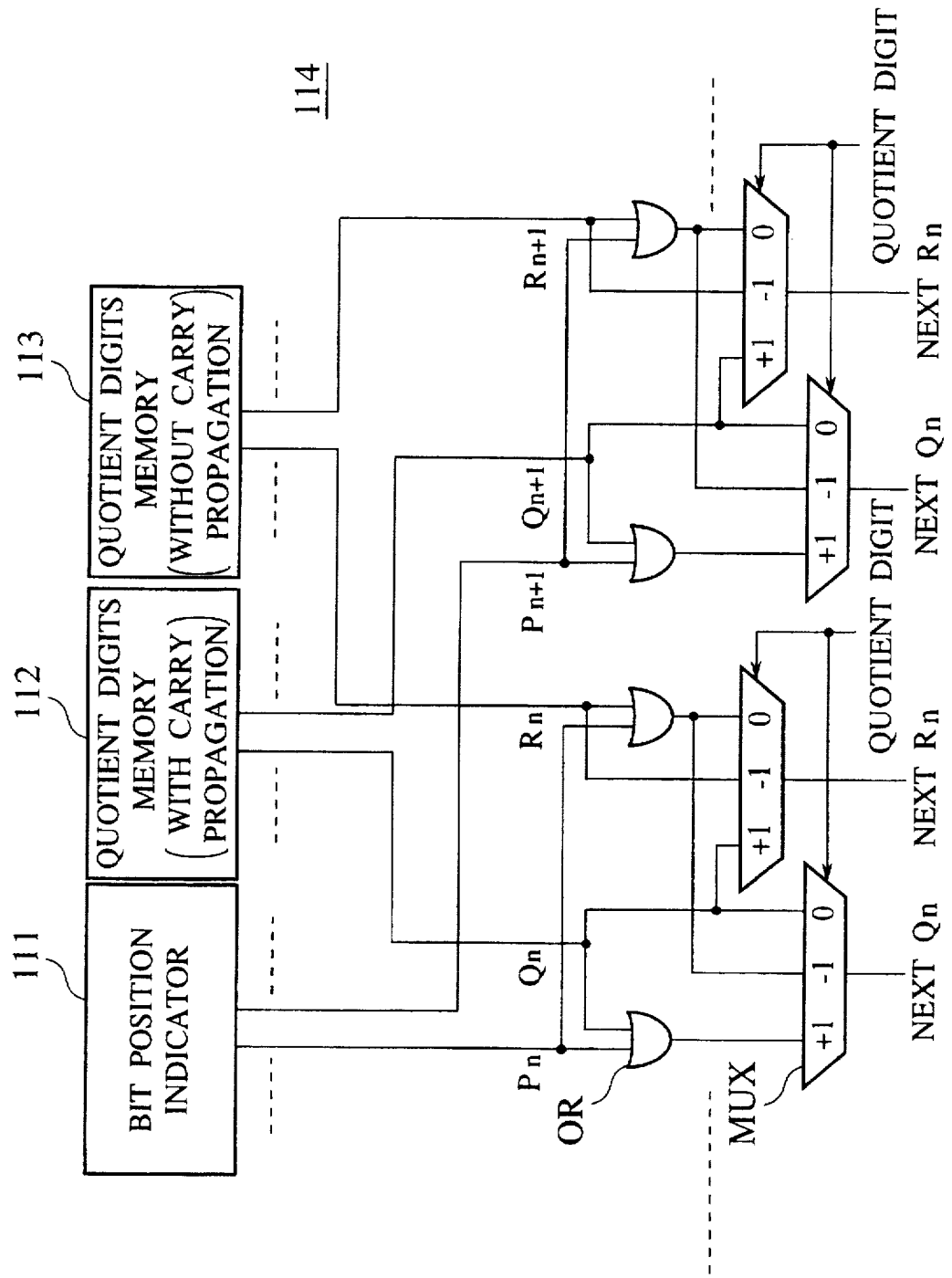
FIG. 10 shows an on-the-fly digit handling block (PQR) according to the second embodiment.

FIG. 10 shows the details of the PQR 114 of FIG. 9. The bit position indicator 111 holds the position of a bit presently processed. Namely, it holds 1 at the bit presently processed and 0 at the other bits. The bit position indicator 111 is connected to an OR gate of each bit. FIG. 10 shows a bit n and the next bit n+1. According to the output of the bit position indicator 111, the PQR 114 provides quotient digit sets as shown in FIG. 11. The quotient digit sets are cleared at the start of a division/square root calculation.

Figure 12:
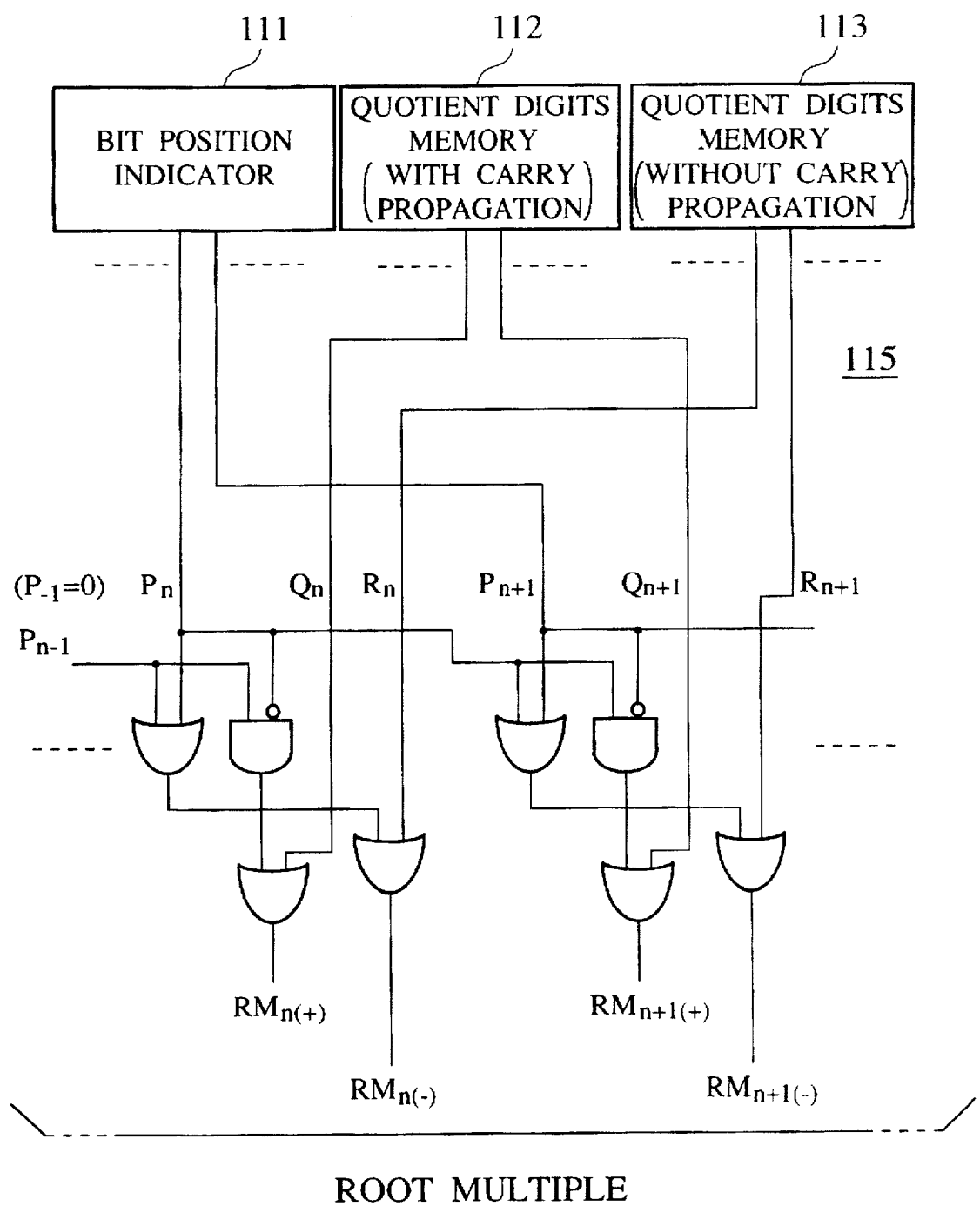
FIG. 12 shows a root multiple formation block (RMF) according to the second embodiment.

FIG. 12 shows the details of the RMF 115 of FIG. 9. The RMF 115 adds a proper value to a quotient digit set according to a signal provided by the bit position indicator 111. Unlike the PQR 114, the RMF 115 adds data to adjacent two bits, and therefore, uses an adjacent bit position indication signal as shown in FIG. 12. FIG. 13 shows the operation of the RMF 115. Since the MSB (n=0) has no higher bit, a bit position "P−1" is automatically set to 0. The RMF 115 provides root multiples according to data from the elements 111, 112, and 113. At this time, it is preferable to reduce hardware by putting restricting conditions on a signal from the bit position indicator 111. The restricting conditions will be explained later with reference to FIG. 23.

The RMF 115 refers to the contents of the memories 112 and 113 as well as a signal from the bit position indicator 111 and provides root multiples by adding 0 and 1 to a quotient digit set with carry propagation if the quotient digit is +1 and by adding 1 and 1 to a quotient digit set with no carry propagation if the quotient digit is −1. If the quotient digit is 0, no root multiples are required. The bit position indicator 111 holds 1 at a bit position where a quotient digit is calculated and 0 at the other bit positions. The output of the bit position indicator 111 is subjected to proper logic operations to add digits to quotient digit sets as mentioned above. When a newly generated quotient digit is +1, the PQR 114 employs a bit position signal Pn, to add 1 and 0 to a current quotient digit set with carry propagation, to provide the next quotient digit sets with and without carry propagation, respectively, as shown in FIG. 11. When the newly generated quotient digit is 0, 0 is added to the current quotient digit set with carry propagation to provide the next quotient digit set with carry propagation, and 1 to the current quotient digit set without carry propagation, to provide the next quotient digit set without carry propagation. If the newly generated quotient digit is −1, 1 and 0 are added to the current quotient digit set without carry propagation, to provide the next quotient digit sets with and without carry propagation, respectively. Then, the operation of the quotient digit sets is complete, and the next root multiples are generated.

Figure 23:
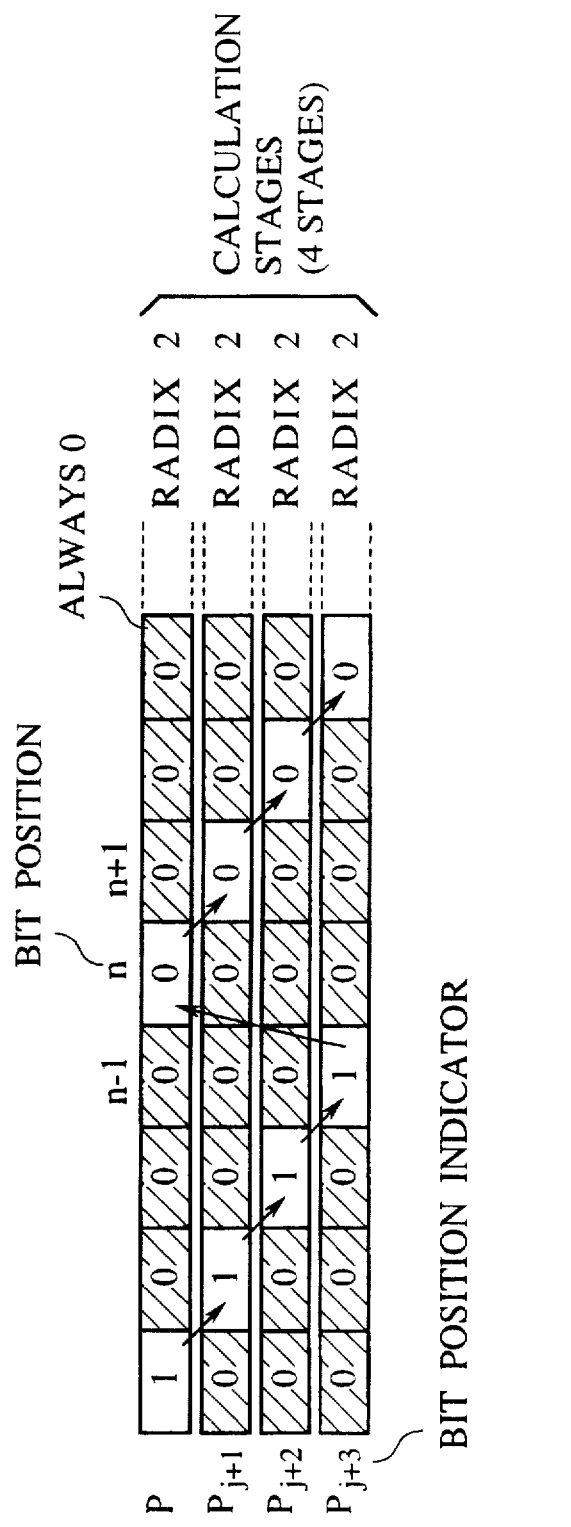
FIG. 23 shows the operations of bit position indicators (P) of four radix 2 calculation units cascaded one after another, according to a seventh embodiment of the present invention.

Conditions will be applied to the output of the bit position indicator 111. For example, the output of the bit position indicator 111 is restricted to change at predetermined intervals as shown in FIG. 23. In this case, there will be bit positions whose contents are unchanged. The details of the arrangement of FIG. 23 will be explained later with reference to the seventh embodiment. For the bit positions whose contents are unchanged, the RMF 115 is modified to reduce hardware, thereby simplifying the calculation unit and shortening a delay time.

In this way, the second embodiment provides a simple calculation unit capable of generating nonredundant root multiples used for calculating a square root. The calculation unit of the second embodiment involves less hardware to realize a high-speed operation.

[Third embodiment]

Figure 14:
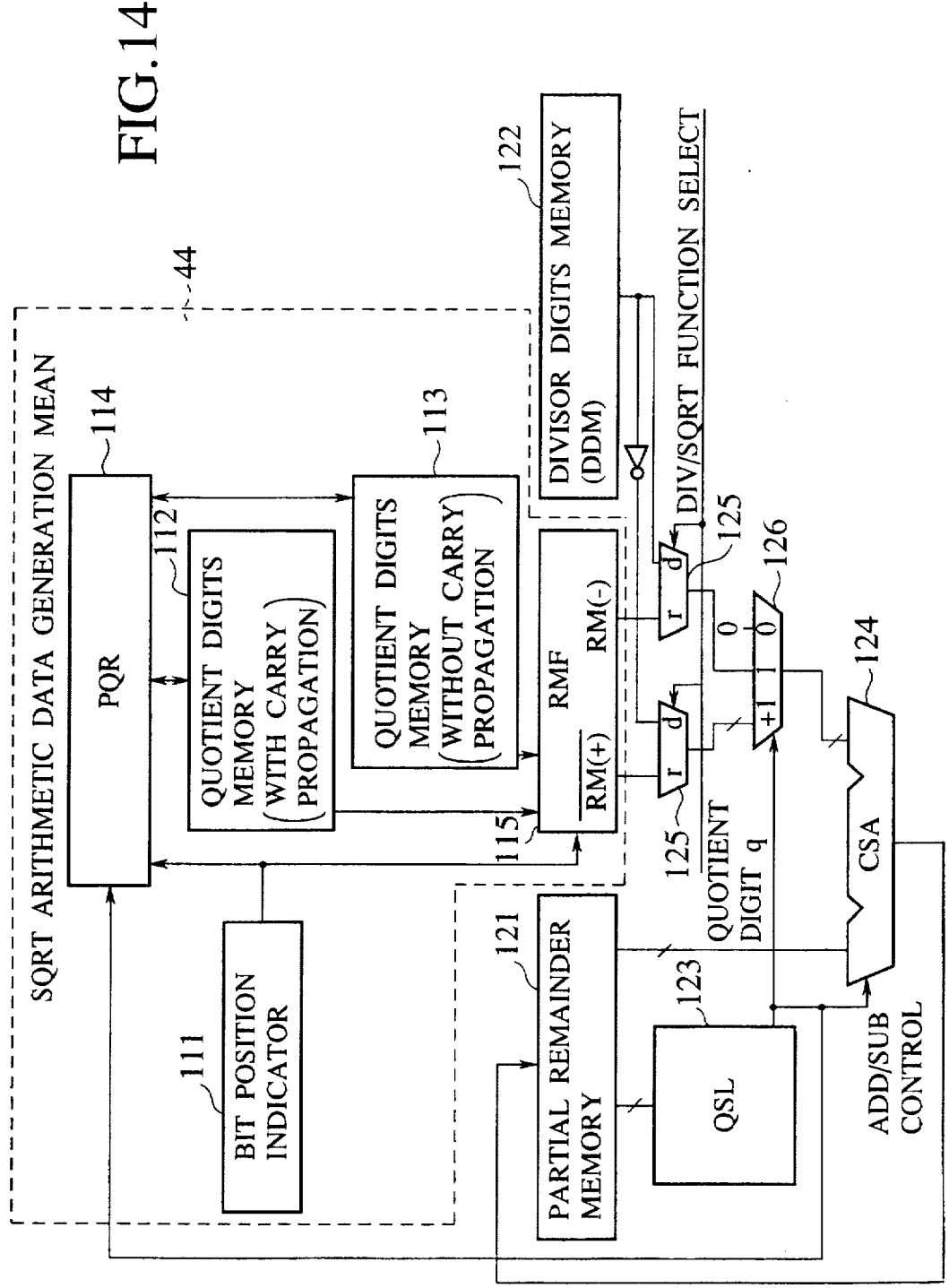
FIG. 14 shows a division/square root calculation unit according to a third embodiment of the present invention.

FIG. 14 is a block diagram showing a calculation unit employing an iteration algorithm with a partial remainder expressed with the sum of a sum digit and carry digit. A partial remainder memory 121 stores the sum and carry digits of a partial remainder. A quotient selection logic (QSL) 123 provides a quotient digit according to the output of the memory 121. A bit position indicator 111 stores the position of a bit where a quotient digit is calculated. A quotient digits memory 112 stores a nonredundant quotient digit set prepared on the assumption that there is carry propagation from a lower bit. A quotient digits memory 113 stores a nonredundant quotient digit set prepared on the assumption that there is no carry propagation from a lower bit. An on-the-fly digit handling block (PQR) 114 generates quotient digit sets according to data from the elements 111, 112, 113 and 123. A root multiple formation block (RMF) 115 generates root multiples used for calculating a square root. These elements 111 to 115 form a square root arithmetic data generator 44. A divisor digits memory (DDM) 122 stores divisor digits. A division/square root selector 125 selects one of the outputs of the RMF 115 and DDM 122. A summand selector 126 selects data to be added to or subtracted from the partial remainder, among the outputs of the selector 125 according to a quotient digit provided by the QSL 123. A carry save adder (CSA) 124 carries out a calculation on the output of the summand selector 126 and the partial remainder provided by the memory 121, according to an addition/subtraction instruction provided by the QSL 123. The output of the CSA 124 is supplied to the memory 121. The selector 125 selects the root multiples or the divisor digit, and the selected signal by the selector 125 is inputted to the summand selector 126. In this way, the third embodiment calculates divisions and square roots by completely sharing hardware, thereby reducing hardware. The algorithm must have a radix of 2. The third embodiment additionally employs only the selector 125 and DDM 122 each having a simple structure, to calculate not only square roots but also divisions. The third embodiment improves the versatility of the calculation unit with a minimum increase in hardware. If the DDM 122 and selector 125 are removed, the calculation unit will work as a square root calculator.

The third embodiment is realized by combining the first and second embodiments. This combination is simple, calculates a square root at high speed, and shortens operation time. The selector 125 selects one of the outputs of the RMF 115 and DDM 122, to calculate divisions and square roots by sharing hardware. The third embodiment stores a nonredundant quotient digit set, to omit the conventional processes of storing a redundant quotient digit and carrying out a full-bit addition in the last stage, thereby reducing hardware.

[Fourth embodiment]

Figure 15:
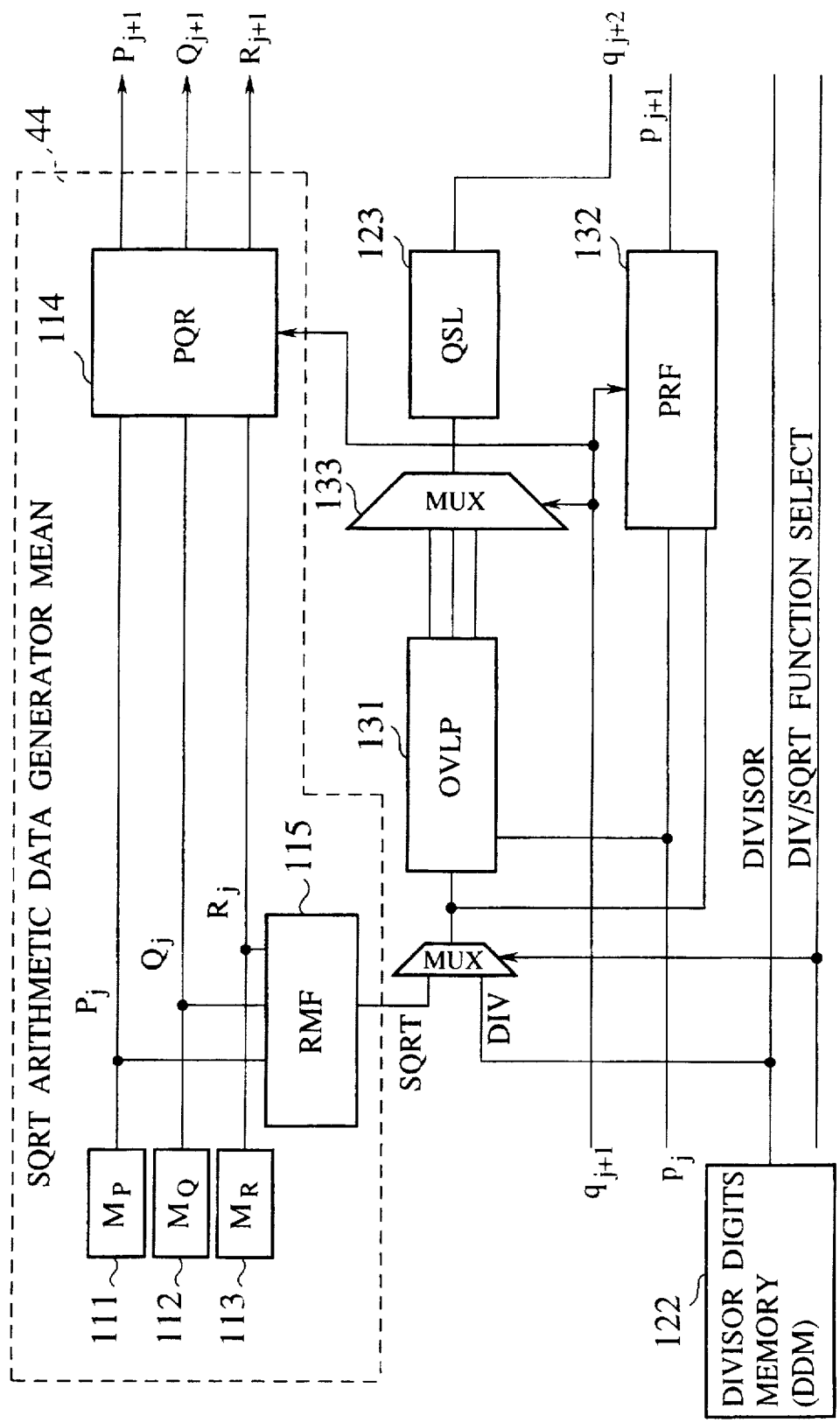
FIG. 15 shows a high-speed division/square root calculation unit according to a fourth embodiment of the present invention.

FIG. 15 is a block diagram showing a calculation unit according to the fourth embodiment of the present invention. This unit calculates a division or square root according to an iteration algorithm with a partial remainder represented with the sum of a sum digit and carry digit. A bit position indicator 111 stores the position of a bit where a quotient digit is calculated. A quotient digits memory 112 stores a nonredundant quotient digit set prepared on the assumption that there is carry propagation from a lower bit. A quotient digits memory 113 stores a nonredundant quotient digit set prepared on the assumption that there is no carry propagation from the lower bit. An on-the-fly digit handling block (PQR) 114 provides quotient digit sets according to data provided by the elements 111, 112, 113 and the qotient digit $q_{j+1}$. A root multiple formation block (RMF) 115 generates root multiples used for calculating a square root. The elements 111 to 115 form a square root arithmetic data generator 44. An overlap execution block (OVLP) 131 estimates the next partial remainders according to the output of the RMF 115 and assumed quotient digits. A selector (MUX) 133 selects one of the outputs of the OVLP 131 according to a determined quotient digit. A quotient selection logic (QSL) 123 selects a quotient digit according to the selection made by the selector 133. A divisor digits memory 122 stores divisor digits. Due to this memory 122, the calculation unit of the fourth embodiment is able to calculate divisions as well as square roots. A partial remainder formation block (PRF) 132 calculates a partial remainder.

Figure 16:
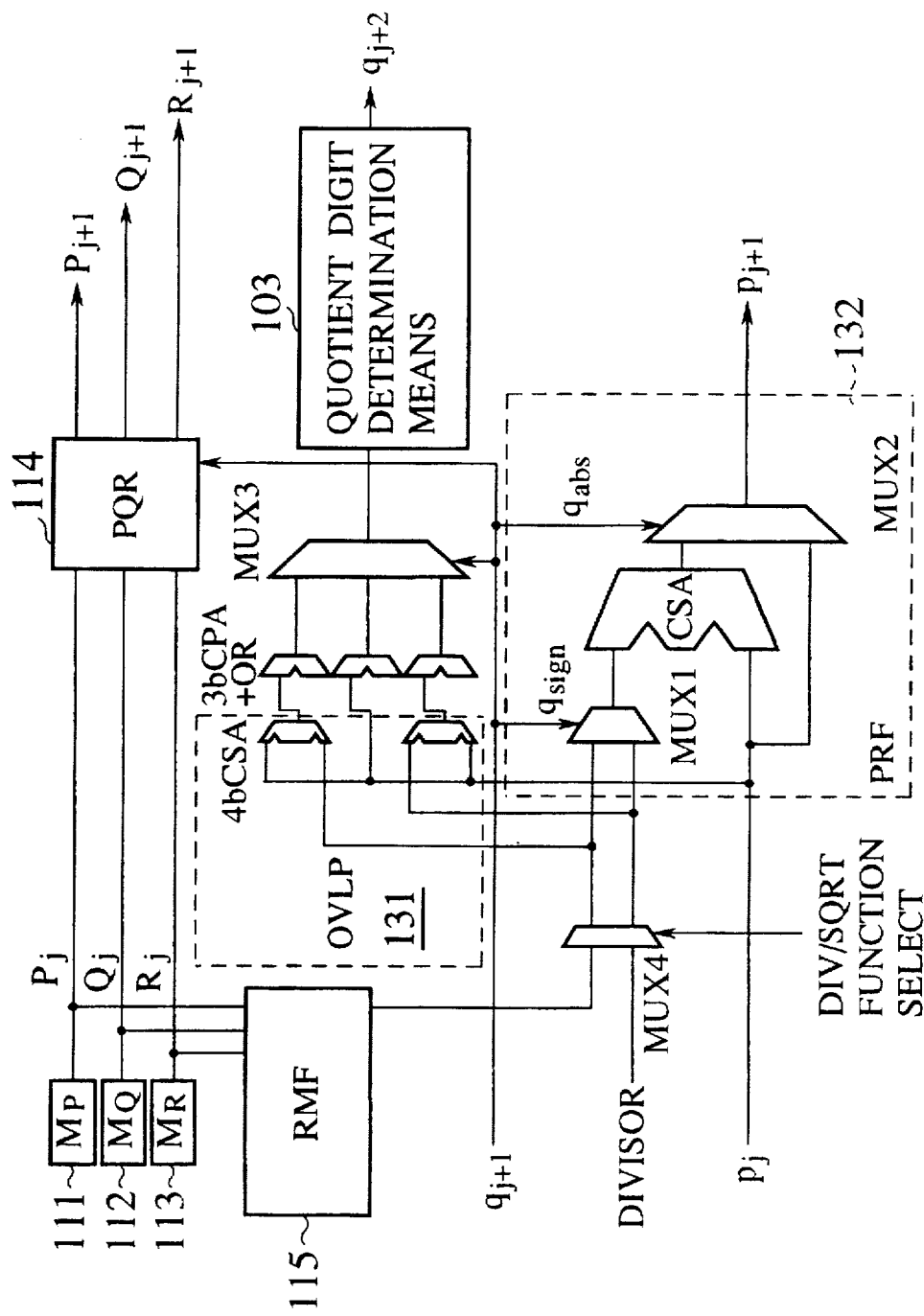
FIG. 16 shows an example of the calculation unit according to the fourth embodiment.

The OVLP 131 estimates the next partial remainders for quotient digits of, for example, +1, 0, and −1, respectively. When the current quotient digit $q_{j+1}$ is determined, the selector (MUX) 133 selects one of the estimated partial remainders, and the QSL 123 selects the next quotient digit $q_{j+2}$ according to the selected partial remainder. The QSL 123 may be arranged in front of the selector 133, to estimate a candidate for quotient digit $q_{j+2}$. In this case, the selector 133 selects one of the estimated quotient digits. The fourth embodiment improves the operation speed of the RMF 115, to produce a temporal margin. This is the reason why the operation in the OVLP 131 is allowed. FIG. 16 shows the details of the fourth embodiment. The OVLP 131 consists of 4-bit carry save adders (4b CSAs) to receive a root multiple or divisor multiple as well as a partial remainder.

In this way, the fourth embodiment estimates the next digits with less hardware at high speed when calculating a square root. These advantages are never realized by the prior arts.

[Fifth embodiment]

Figure 17:
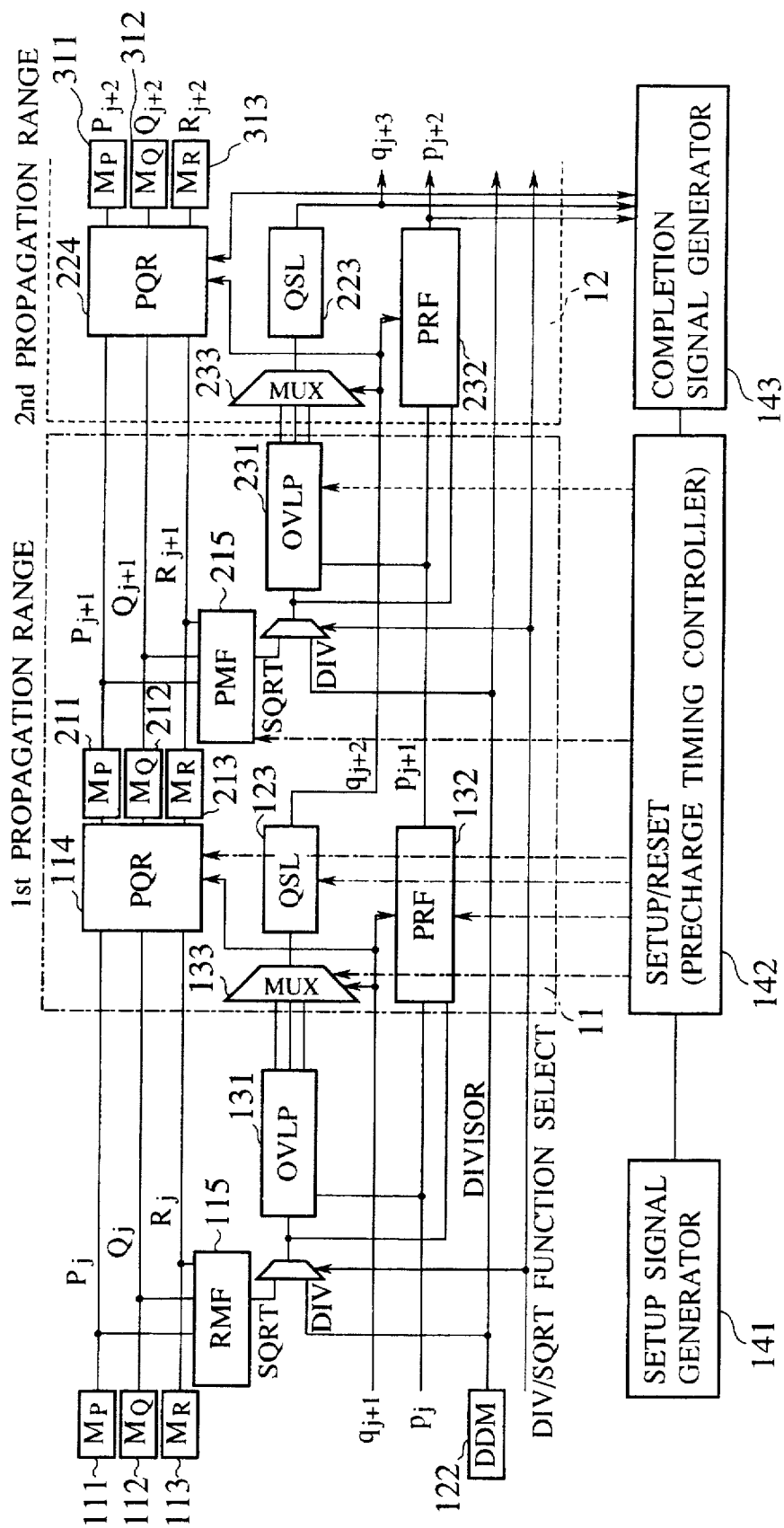
FIG. 17 shows a self-timed high-speed division/square root calculation unit according to a fifth embodiment of the present invention.
Figure 18:
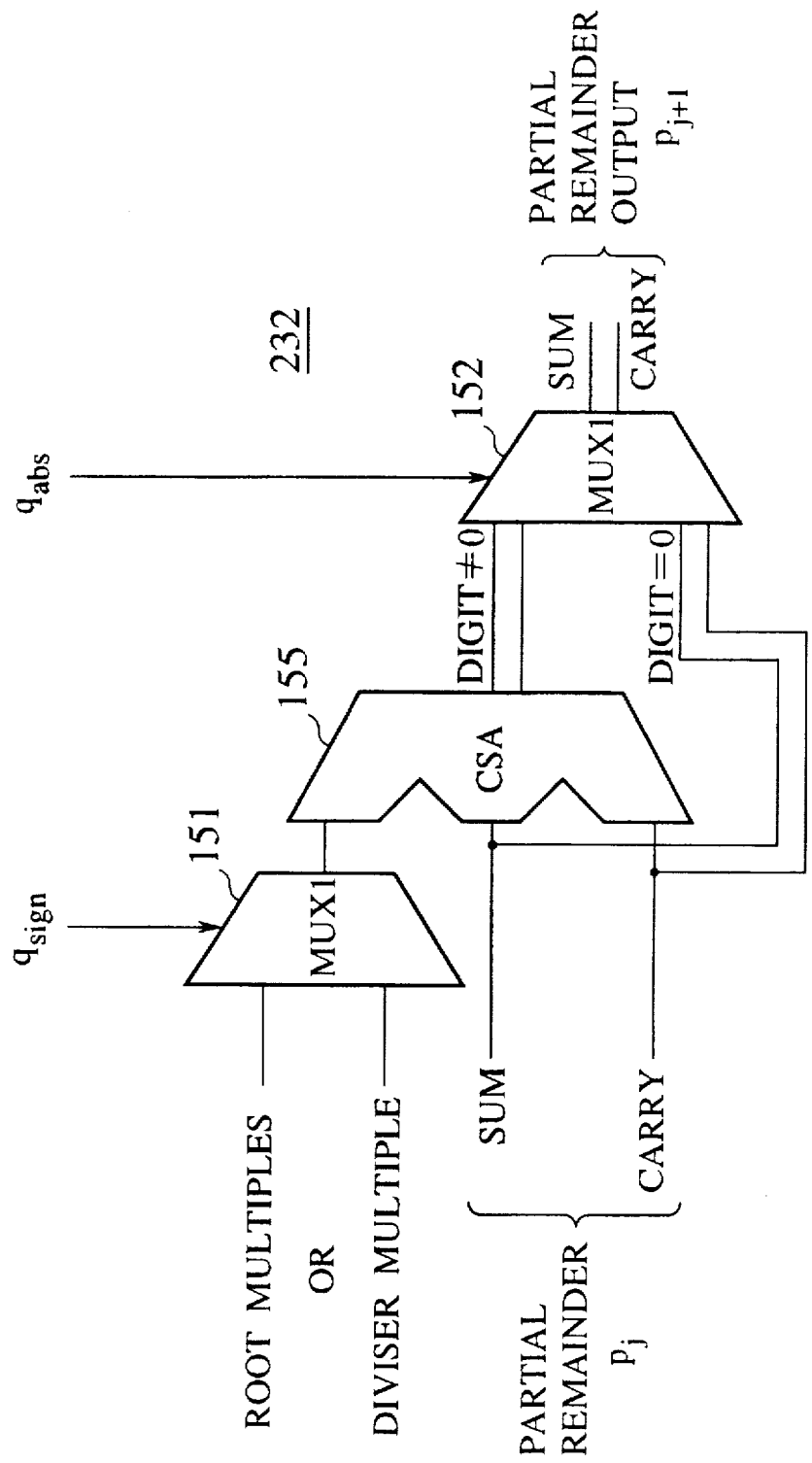
FIG. 18 shows a partial remainder formation block (PRF) according to the fifth embodiment.

FIG. 17 is a block diagram showing a self-timed division/square root calculation unit according to the fifth embodiment of the present invention. This unit expresses a partial remainder with the sum of a sum digit and carry digit and calculates a square root according to an iteration algorithm. The unit consists of simultaneous setup/reset signal propagation ranges 11, 12, and so on cascaded one after another, so that they are set up and reset range by range. The simultaneous setup/reset signal propagation range may be abbreviated as "propagation range" hereinafter. A bit position indicator 111 stores the position of a bit where a quotient digit is calculated. A quotient digits memory 112 stores a nonredundant quotient digit set prepared on the assumption that there is carry propagation from a lower bit. A quotient digits memory 113 stores a nonredundant quotient digit set prepared on the assumption that there is no carry propagation from the lower bit. A first root multiple formation block (RMF) 115 generates root multiples according to the outputs Pj, Qj, and RJ of the elements 111, 112, and 113. A first overlap execution block (OVLP) 131 estimates the next partial remainders according to the output of the RMF 115 and assumed current quotient digits. A divisor digits memory 122 stores divisor digits. These elements are arranged in front of the first propagation range 11. The first propagation range 11 receives the estimated partial remainders from the first OVLP 131. The first propagation range 11 provides the second propagation range 12 with estimated partial remainders. The third and other propagation ranges are not shown in FIG. 17. Elements contained in the first propagation range 11 will be explained. A first selector (MUX) 133 selects one of the estimated partial remainders provided by the first OVLP 131 once the current quotient digit is determined. A first quotient selection logic (QSL) 123 selects a quotient digit according to the selected partial remainder. A first partial remainder formation block (PRF) 132 calculates a partial remainder. A first on-the-fly digit handling block (PQR) 114 supplies data necessary for generating root multiples. A second root multiple formation block (RMF) 215 generates root multiples. Also contained in the first propagation range 11 are a second bit position indicator 211, a second quotient digit set (with carry propagation) memory 212, and a second quotient digit set (without carry propagation) memory 213. A second OVLP 231 provides the second propagation range 12 with estimated partial remainders.

The second propagation range 12 resembles the first propagation range 11. A second selector (MUX) 233 selects one of the estimated partial remainders provided by the second OVLP 231. A second QSL 223 selects a quotient digit according to the selected partial remainder. Also contained in the second propagation range 12 are a second PQR 224, a third bit position indicator 311, a third quotient digit set (with carry propagation) memory 312, and a third quotient digit set (without carry propagation) memory 313. A third RMF, a third OVLP, etc., are not shown in FIG. 17.

A completion signal generator 143 generates a completion signal once detecting the completion of the operation of at least one of the second PQR 224, second PRF 232, and second QSL 223. A setup/reset controller (precharge timing controller) 142 sets up and resets the first propagation range 11 in response to the completion signal from the completion signal generator 143. And a setup signal generator 141 connected to the setup/reset controller 142 supplies a setup signal to the controller 142.

FIG. 17 shows only a part of the calculation unit according to the fifth embodiment. In practice, at least three propagation ranges are connected in series. Each of the propagation ranges corresponds to the calculation unit of the fourth embodiment of FIG. 15. It is important for the self-timed calculation unit to correctly generate the completion signal. Accordingly, the elements of the calculation unit according to the fifth embodiment are each a complementary logic output dynamic circuit employing a 2-wire logic. Given two nodes are precharged to a supply voltage in response to a reset signal. The two nodes at this moment are in an uncompleted status. The nodes are connected to complementary logic circuits, so that one of the logic circuits is discharged to drop the potential of the corresponding node. When the potential drop is detected at any one of the nodes, it is determined to be a completion status. Connecting these circuits in multiple stages may enable the detection of the completion of a calculation. Since these circuits must be reset (precharged) and set up (release the precharged state) before starting a calculation, the timing of resetting and setting up is very important. To realize this, the embodiment of FIG. 17 handles each of the propagation ranges as a unit to precharge. For example, the first propagation range 11 is reset only after each of the QSL 223, PQR 224, and PRF 232 of the second propagation range 12 completes its operation. Accordingly, the completion signal generator 143 detects completion signals sent from these elements 223, 224, and 232. The completion signal generator 143 provides the AND of the completion signals sent from these elements, to secure the completion of calculations performed by these elements. This method, however, greatly increases the number of signal lines required. To solve this problem, the operation speed of the PQR 114 (224) is designed to be always faster than that of the QSL 123 (223). Then, it is not necessary to detect the completion of operation of the PQR 114 (224). This results in improving the speed of detecting the completion of calculations by the number of bits of a quotient digit.

It will be understood that the generation timing of all signals is controlled in the fifth embodiment. These signals follow some kinds of arithmetic operation in the propagation range 12, which comprising PRF 232, MUX 233, QSL 223 and PQR 224, and outputted to the next propagation range 13. Hence, it is possible to detect the completion of the arithmetic operation only by the signal outputted from QSL 223.

In this way, the fifth embodiment detects the completion of calculations with a large margin and a simple structure. No prior art suggests such effect. In addition to simply detecting the completion of calculations, the fifth embodiment reduces hardware. The self-timed calculation unit of the fifth embodiment is capable of calculating square roots as well as divisions by sharing hardware. This is unachievable by the prior arts. A plurality of the calculation units of the fifth embodiment may be connected together to form a high-speed calculation system.

[Sixth embodiment]

Figure 19:
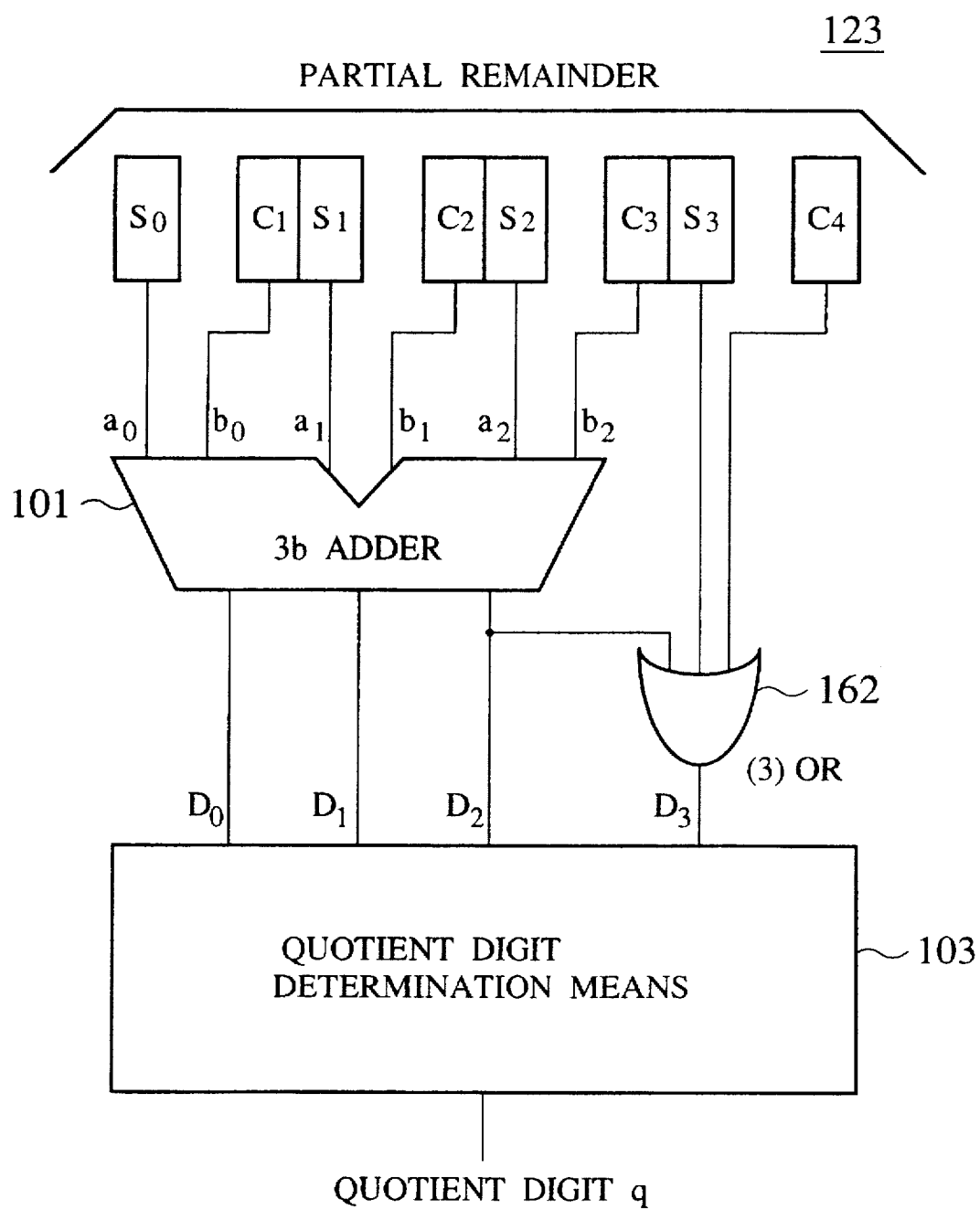
FIG. 19 shows a quotient selection logic (QSL) employing a 3-bit adder and a 3-input 1-output OR gate according to a sixth embodiment of the present invention.
Figure 21C:
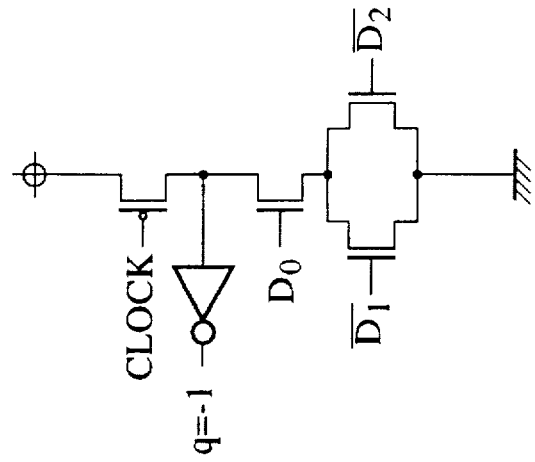
FIGS. 21A–21C show dynamic CMOS circuits realizing the quotient selection rules of FIG. 20A.
Figure 21B:
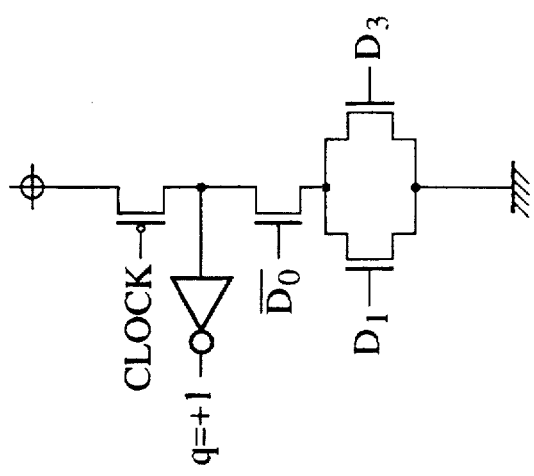
Figure 21A:
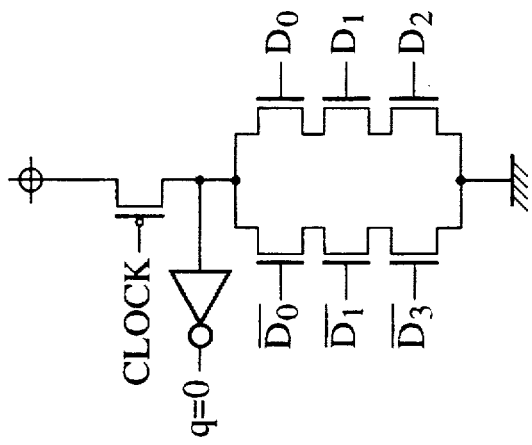
Figure 22:
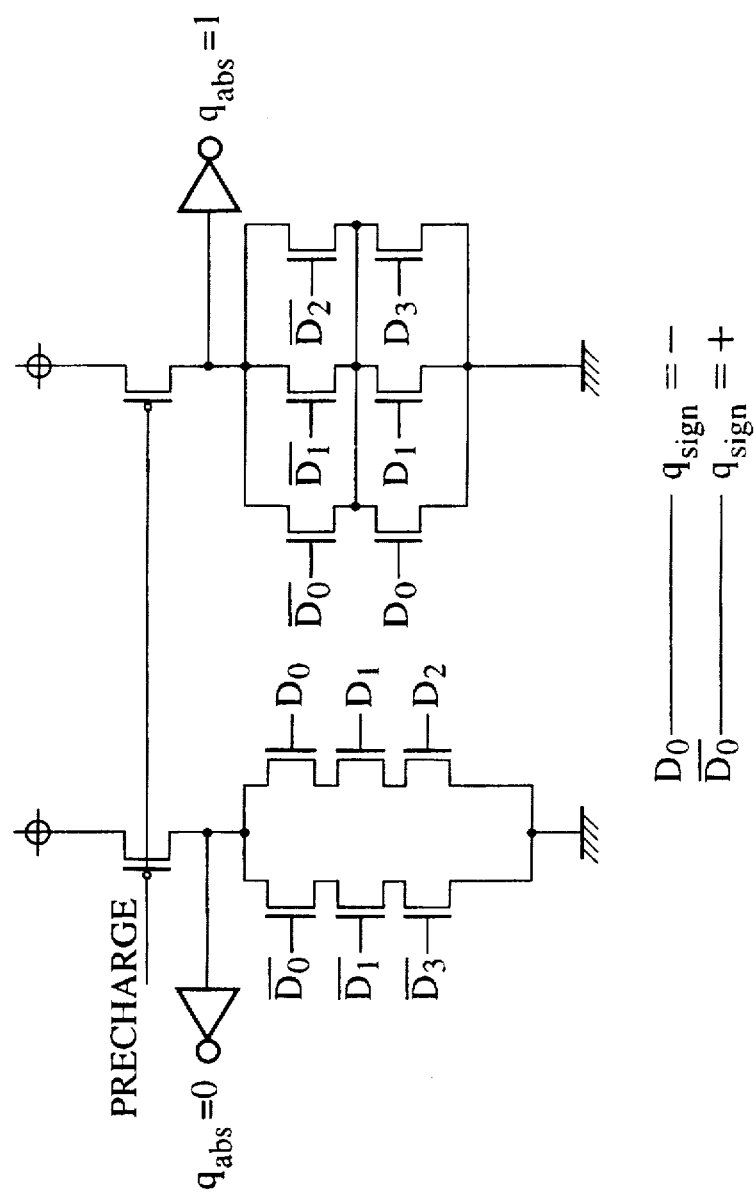
FIG. 22 shows dynamic CMOS circuits realizing the quotient selection rules of FIG. 20B.

FIG. 19 is a block diagram showing a quotient selection logic (QSL) 123 of a calculation unit according to the sixth embodiment of the present invention. This embodiment expresses a partial remainder as the sum of a sum digit and carry digit and calculates a division or square root according to a radix 2 iteration algorithm. A 3-bit adder 101 adds higher three bits of each of the two digits that form a redundant partial remainder to each other. A 3-input OR gate 162 provides the OR of the LSB of the output of the adder 101 and the fourth bits of the two digits of the partial remainder. A quotient digit determination block 103 determines the next quotient digit according to the outputs of the adder 101 and OR gate 162.

The carry bits C1 to C4 and sum bits S0 to S3 of the two digits of the partial remainder are used to correctly weight bits. Terminals a0 to a2 of the adder 101 receive the sum bits S0 to S2, respectively, and terminals b0 to b2 thereof receive the carry bits C1 to C3, respectively. The adder 101 provides a sum output of bits D0 to D2. Where S0 and C1 are the MSBs in the partial remainder, respectively. The bit D0 represents the sign of the partial remainder, and the bits D1 and D2 represent the value thereof. The OR gate 162 provides the OR of the LSBs S3 and C4 and the LSB D2 of the output of the adder 101. Namely, the OR gate 162 provides an output bit D3. According to these bits D0 to D3, quotient selection rules of FIGS. 20A and 20B are referred to, to provide a quotient digit. When a given partial remainder is in a redundant form, the radix 2 SRT algorithm causes a problem if the bits D0 to D2 are 0, 1, and 1, respectively. If a decimal point is between the bits D1 and D2, a value of 01.1 of the bits D0 to D2 is equal to +1.5 at the minimum in decimal notation when all lower carry and sum bits are each 0. If these lower carry and sum bits are each 1, the value will be slightly larger than −1.5. Namely, the partial remainder will be in the discrete ranges of +1.5 to 2.0 and −2.0 to −1.5. To solve this problem, the prior art employs a 4-bit carry propagation adder, or a 3-bit adder plus a memory for holding a previous quotient digit as shown in FIG. 4. Using the 4-bit carry propagation adder increases a delay time, and employing the additional memory increases hardware and deteriorates the symmetry of quotient selection rules. On the other hand, the arrangement FIG. 19 and the quotient selection rules of FIG. 20A or 20B according to the sixth embodiment secure the symmetry of quotient selection rules and a high-speed operation only by adding the simple OR gate 162 to the adder 101. The bits D0 to D2 of 0, 1, and 1 will provide a new partial remainder in the range of −2.0 and −1.5, if a quotient digit of +1is selected with respect to bits D0 to D2 of each 0. Accordingly, the present invention checks the bit D3 only when the bits D0 to D2 are each 0, to test whether or not the current partial remainder is above 00.01 (binary). If it is less than 00.01 (binary), i.e., if the bit D3 is 0, a quotient digit of 0 is selected to avoid the problem. The symmetry of the quotient selection rules of FIGS. 20A and 20B is secured. The sixth embodiment is theoretically the same as the first embodiment of FIG. 7. The logic of the quotient digit determination block 103 of the sixth embodiment is simpler than that of the first embodiment, to provide a higher operation speed. Among the source bits that form the bit D3, the bits S3 and C4 are obtained as soon as the partial remainder is generated. The bit D2 is obtained by a single step of exclusive OR of the bits S2 and C3, so that it is obtained earlier than the other bits D0 and D1. Accordingly, time for producing the OR bit D3 does not influence the critical path of the quotient digit selection. The quotient digit, therefore, is determined at high speed. FIGS. 21A–21C and 22 show dynamic CMOS logic circuits for realizing the rules of FIGS. 20A and 20B.

On the other hand, the prior art of FIG. 4 selects a quotient digit of +1 if an estimated higher bit of the partial remainder is 0. If the partial remainder is 0 and the sum of higher three bits of the partial remainder is 0, the prior art will select a wrong quotient digit. This problem may be avoided by employing an arrangement that determines a quotient digit according to the sum of higher four bits of a partial remainder. This 4-bit addition arrangement, however, extends an operation time. On the other hand, the QSL 132 and the quotient digit determination block 103 of the sixth embodiment correctly select a quotient digit. If the prior art of FIG. 4 is employed, the problem that all bits of a redundant partial remainder are each 0 may arise. Accordingly, it is impossible to use the QSL and quotient digit determination block of the prior art. Only the combination of elements of the sixth embodiment is able to secure a correct partial remainder. Namely, the sixth embodiment provides a calculation unit which secures constant correctness of partial remainder, while maintaining th high-speed characteristics by using the 3-bit adder 101. The similar merit is realized with the QSL 123 and quotient digit determination block 103 of the first embodiment of FIG. 7. However, the QSL 123 and quotient digit determination block 103 of the sixth embodiment are faster in an operation speed than those of the first embodiment.

In this way, the sixth embodiment realizes a high-speed operation with small hardware compared with the prior arts. In particular, the sixth embodiment allows a QSL 123 which secures the correct partial remainder by using the 3-bit adder 101, without increasing an operation time for selecting a quotient digit. This effect is unachievable by the prior arts. It is possible to omit the fault repairing operation, in which a fault of quotient is corrected, if necessary, according to a correctness judgment of quotient, following the arithmetic operation by the prior art organization. Hence the amount of hardware components and operation time for the fault repairing can be reduced in the sixth embodiment.

[Seventh embodiment]

FIG. 23 shows the seventh embodiment of the present invention. Four radix 2 calculation units are cascaded one after another, to calculate a 4-bit quotient digit in one iteration step.

The calculation unit of the seventh embodiment successively changes redundant quotient digits into nonredundant ones, and calculates a division or square root according to an iteration algorithm. This calculation unit has on-the-fly quotient digit decoders (46 of FIG. 9) cascaded one after another. In each of the on-the-fly quotient digit decoders 46, a bit position indicator 111 stores the position of a bit where a current quotient digit is calculated with the a different value being allocated to the bit from the other bits. A first quotient digits memory 112 stores a nonredundant quotient digit set prepared on the assumption that there is carry propagation. A second quotient digits memory 113 stores a nonredundant quotient digit set prepared on the assumption that there is no carry propagation. An on-the-fly digit handling block (PQR) 114 generates the next quotient digit sets. These elements 111 to 114 form the on-the-fly quotient digit decoder 46. A plurality of decoders 46 including at least two decoders 46 are cascaded one after another to form the calculation unit. The calculation unit is capable of providing a quotient digit whose number of bits is at least two, in a single operation.

Figure 24:
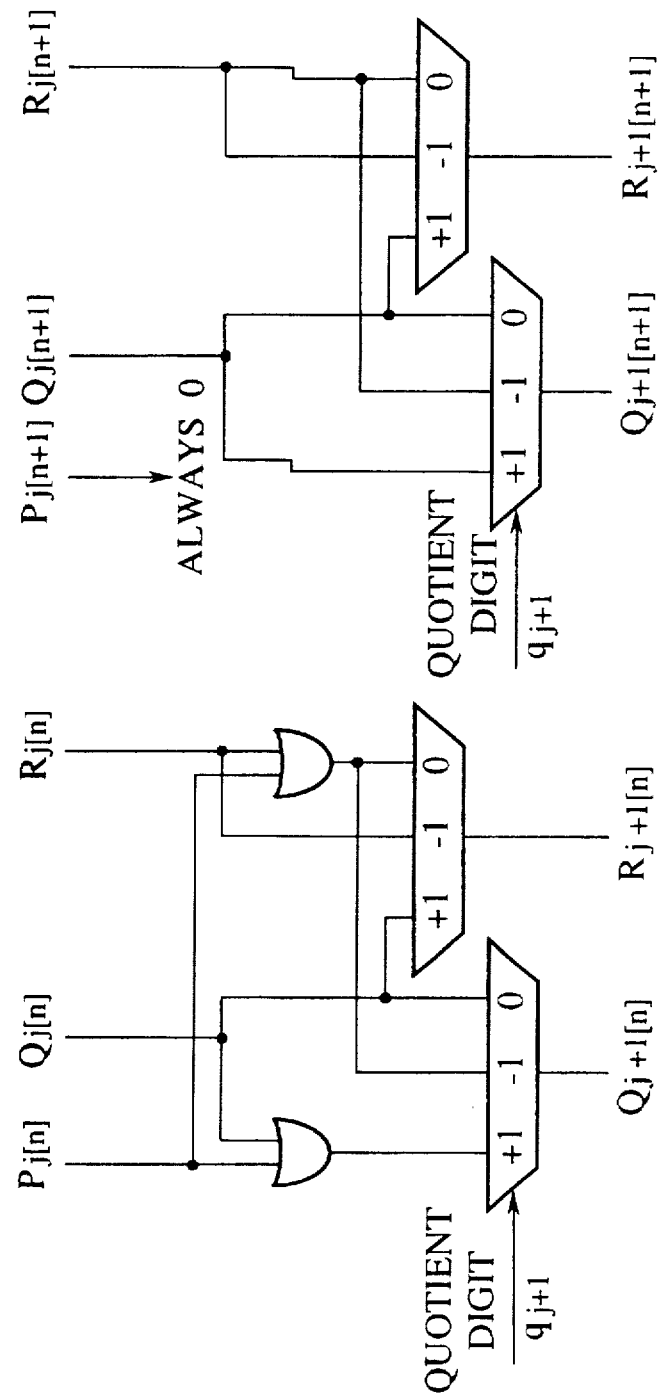
FIG. 24 shows on-the-fly quotient digit decoders according to the seventh embodiment.

The bit position indicator P of FIG. 23 indicates the position of a bit where a quotient digit is calculated. An indication of the bit position indicator P moves at intervals of four bits whenever data is passed through the calculation unit. Only at the position where the remainder of 4 is equal to a given value in each radix 2 calculation unit, the indicator P is set to 1. Accordingly, the indicator P is unchanged at the remaining ¾ bit positions. Since the on-the-fly quotient digit decoder 46 adds specific bit data at the bit position where a quotient digit is calculated, ¾ of the bit positions never cause the addition of specific bit data. Such unchanged positions may have hardware of FIG. 24, to greatly reduce hardware compared with the second embodiment of FIG. 10.

Figure 6:
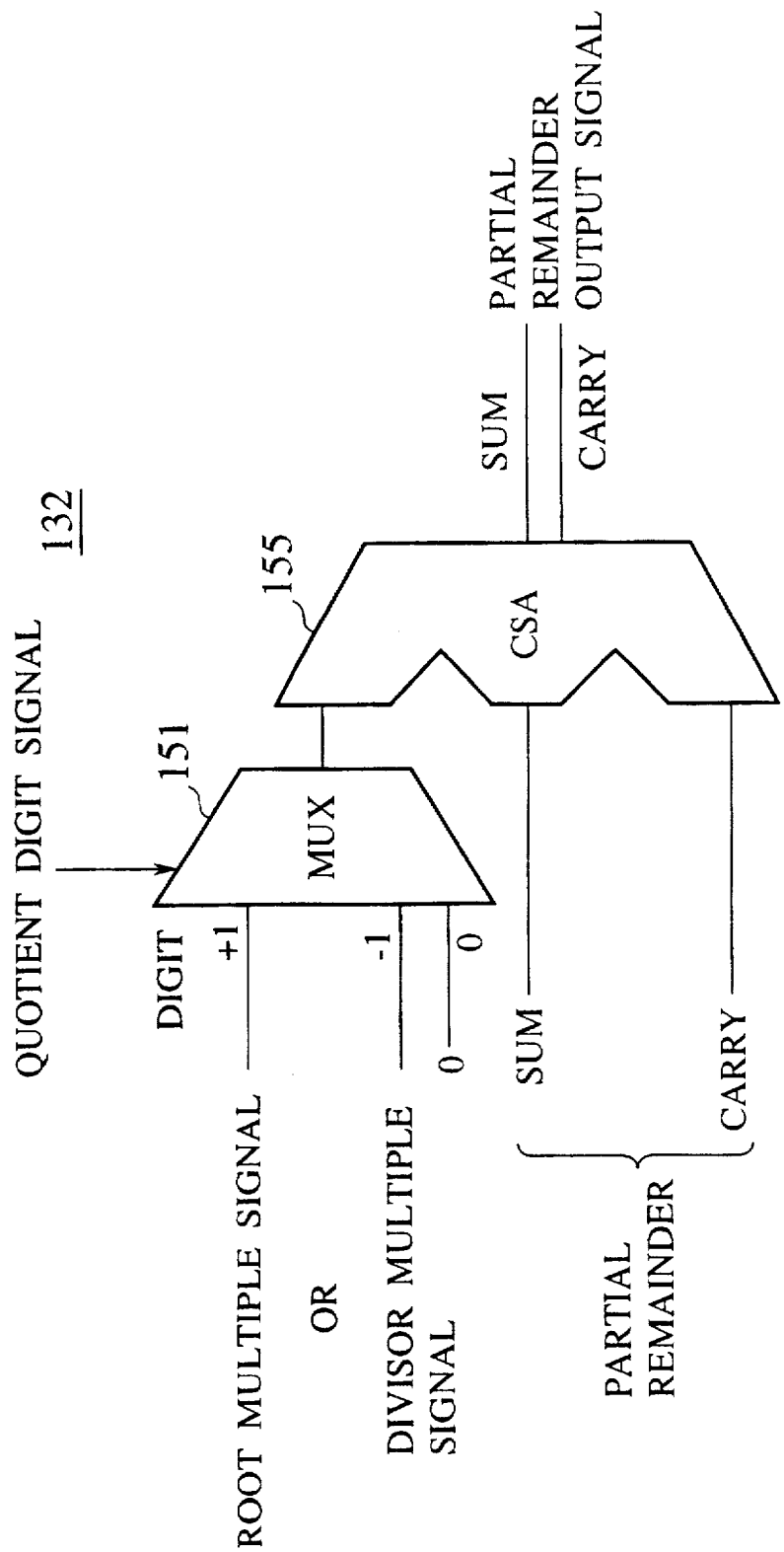
FIG. 6 shows a partial remainder formation block (PRF) according to a prior art.
Figure 25A:
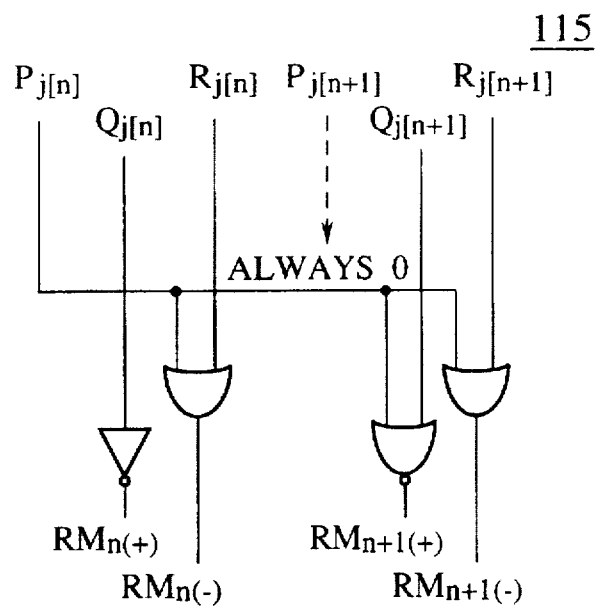
FIGS. 25A and 25B show root multiple formation blocks (RMFs) according to the seventh embodiment.
Figure 25B:
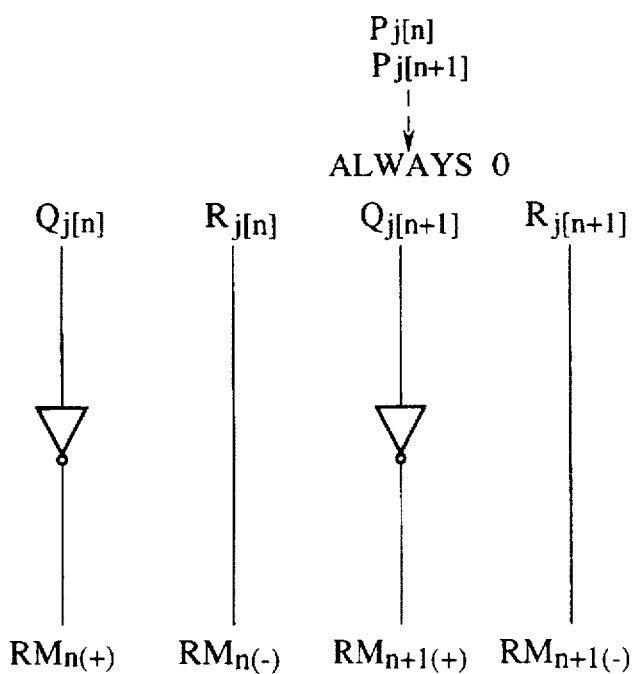

Each decoder 46 may have a root multiple formation block (RMF) 115 to calculate square roots. FIGS. 25A and 25B show examples of the RMF 115 according to the seventh embodiment. Due to the restricting conditions of FIG. 23 related to the bit position indicators, the number of hardware components of FIG. 25A is quite smaller than that of the second embodiment of FIG. 6. In addition, time for generating root multiples is shortened due to a decrease in the number of logic gates. By adding further restricting conditions, the number of hardware components can further be reduced as shown in FIG. 25B.

Figure 26:
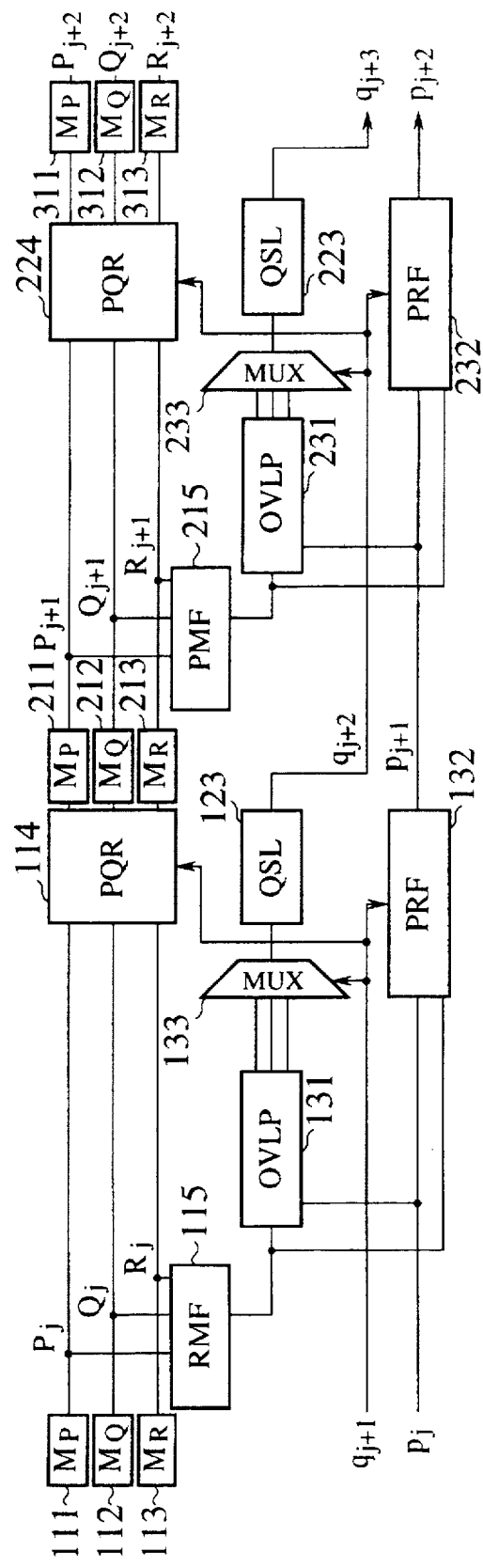
FIG. 26 shows an overlap square root calculation unit with high-speed root multiple formation, according to the seventh embodiment.

FIG. 26 shows a radix 2 square root calculation unit employing an overlap method, according to the seventh embodiment. A root multiple formation block (RMF) 115 prepares root multiples corresponding to assumed quotient digits of +1 and −1, respectively. An overlap execution block (OVLP) 131 estimates the next partial remainders according to the root multiples. As soon as the current quotient digit is calculated, a selector (MUX) 133 selects a correct one of the estimated partial remainders. A quotient selection logic (QSL) 123 determines a quotient digit. Time for generating the root multiples will not affect the operation time of the calculation unit if time between the generation of the current quotient digit and the generation of the root multiples is shorter than time for adding or subtracting the root multiples to or from the calculated partial remainder. The QSL 123 (223) may be the same structure as that of FIG. 7 or 19. In FIG. 23, the cascaded on-the-fly quotient digit decoders or root multiple formation blocks use the fact that an indication of the bit position indicator $P_j$ is changed at intervals of n bits at an input end of the calculation unit when calculating a quotient digit of n bits (n being equal to or greater than 2) for each pass of signal. At positions where bit values are unchanged, the redundant-to-nonredundant conversion and the generation of root multiples are simplified accordingly. This results in reducing hardware smaller than a calculation unit that is designed on the assumption that an indication of the bit position indicator is changed bit by bit. This is applicable to cascaded calculation units. Namely, taking the unchanged bit positions into account may greatly reduce the hardware of the cascaded calculation units.

Figure 27:
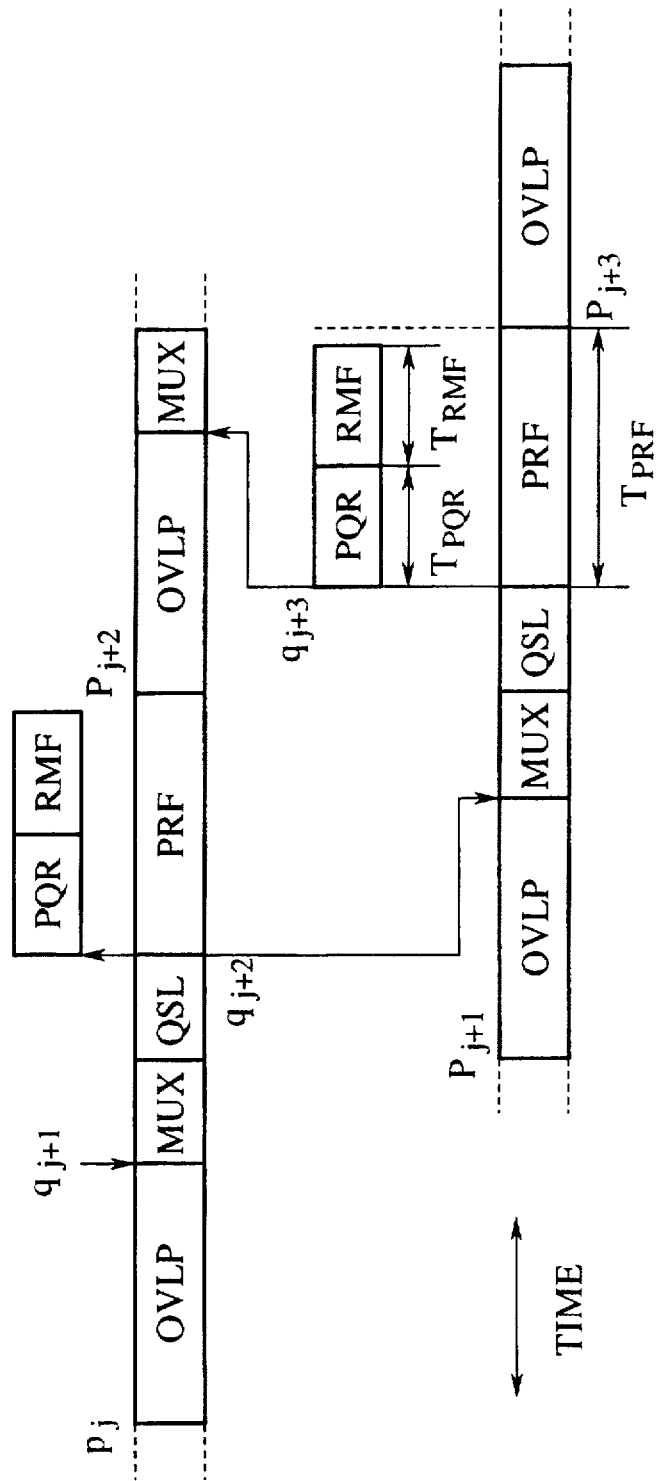
FIG. 27 shows the operation time of each element of the overlap calculation unit and the conditions of calculating a square root and a division at the same speed, according to the seventh embodiment.

Conditions for calculating square roots and divisions at the same speed in an overlap calculation unit will be studied. FIG. 27 shows operation time of an overlap calculation unit employing the overlap execution block (OVLP) of FIG. 26. Each horizontal length corresponds to operation time. The overlap operation always involves two different flows of data signals as shown in FIG. 27. The flows involve a partial remainder signal "p" and a quotient digit signal "q." To calculate a division, the on-the-fly digit handling block (PQR) and root multiple formation block (RMF) are not required. These elements are required for calculating a square root. Before the partial remainder formation block (PRF) provides an output signal, the RMF must provide an output signal, or the OVLP is unable to operate at once and the calculation time of a square root becomes longer than that of a division. If the RMF completes its operation earlier than the PRF, the OVLP is able to operate just after the completion of the operation of the PRF. In this case, square roots and divisions are calculated at the same speed. The operations of the PRF and PQR are started after receiving the quotient digit q. Accordingly, the above conditions are written as follows:

operation time of PRF>(operation time of PQR+operation time of RMF)

Figure 28:
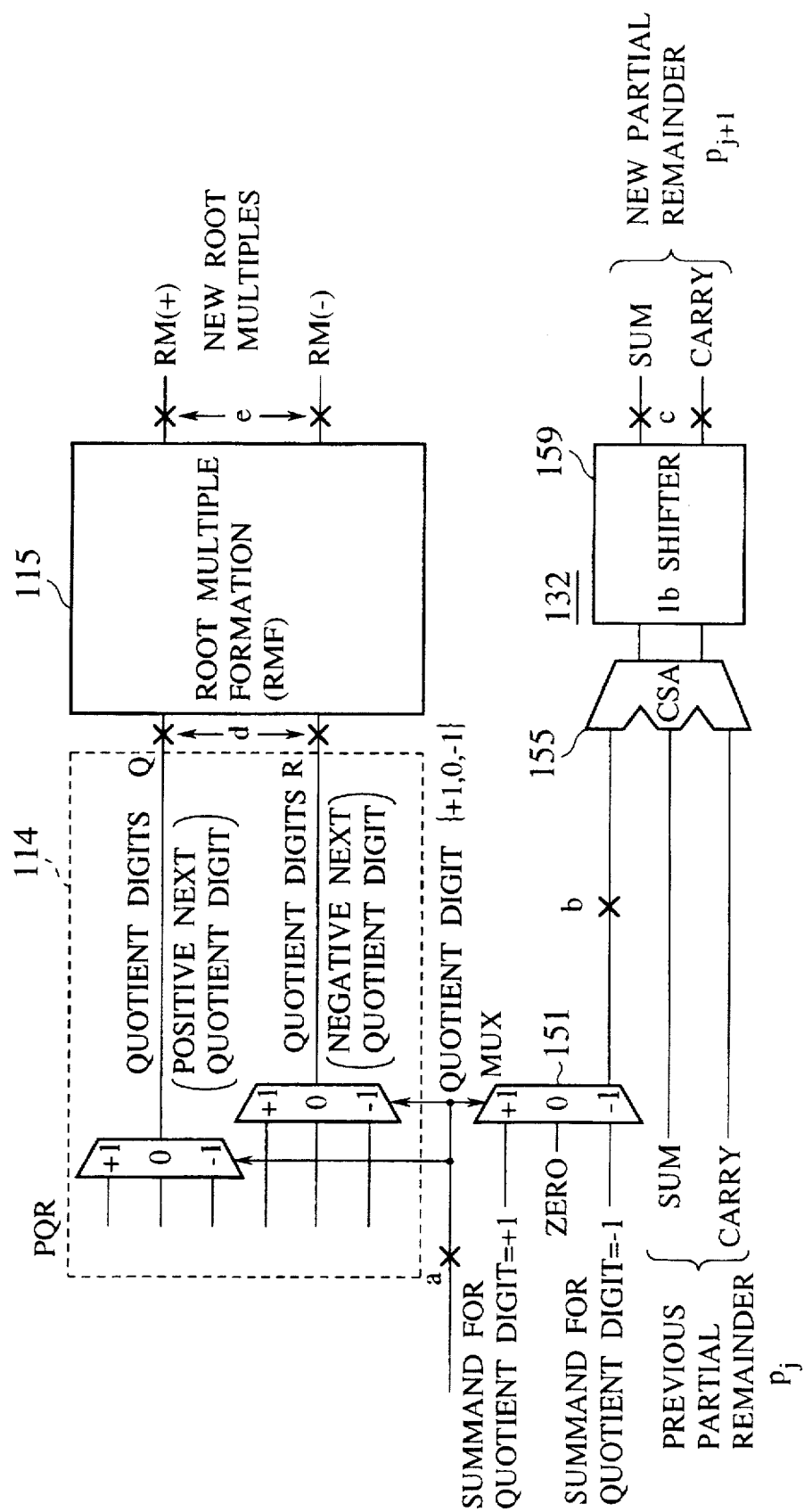
FIG. 28 shows an example of the overlap calculation unit according to the seventh embodiment.

FIG. 28 shows a calculation unit related to FIG. 27. When a quotient digit signal is provided at a point "a," 3-input 1-output selectors (MUXs) 151 provide signals to points "b" and "d" substantially at the same time. According to signal paths in a PRF 132, a calculation completes at point "c" through a carry save adder (CSA) 155. A 1-bit shifter 159 is a simple wiring element, and therefore, needs substantially no operation time. On the other hand, a signal path for root multiples provides an output signal at a point "e" through an RMF 115. What is important is a difference in signal arrival time between the points c and e. This difference corresponds to a difference in calculation time between the RMF 115 and the CSA 155. The critical path of the CSA 155 is a 3-input 1-output exclusive OR gate. The critical path of the RMF 115 is a 2-input 1-output OR gate (FIG. 25A). The calculation time of the 3-input 1-output exclusive OR gate is always longer than that of the 2-input 1-output OR gate. Namely, the RMF 115 first completes its calculation to provide root multiples to the point e, and thereafter, a new partial remainder appears at the point c. In this way, the calculation time of a square root becomes equal to that of a division.

As explained above, the seventh embodiment of the present invention calculates at least two quotient digits in one step of operation, to thereby reduce the hardware of the on-the-fly quotient digit decoder and speedily form root multiples used for a root multiple calculation with the use of the decoder. This results in reducing the hardware for generating root multiples. The seventh embodiment greatly reduces time for calculating root multiples and speedily estimates the next partial remainder, to thereby calculate a square root according to the overlap method at high speed.

[Eighth embodiment]

Figure 29:
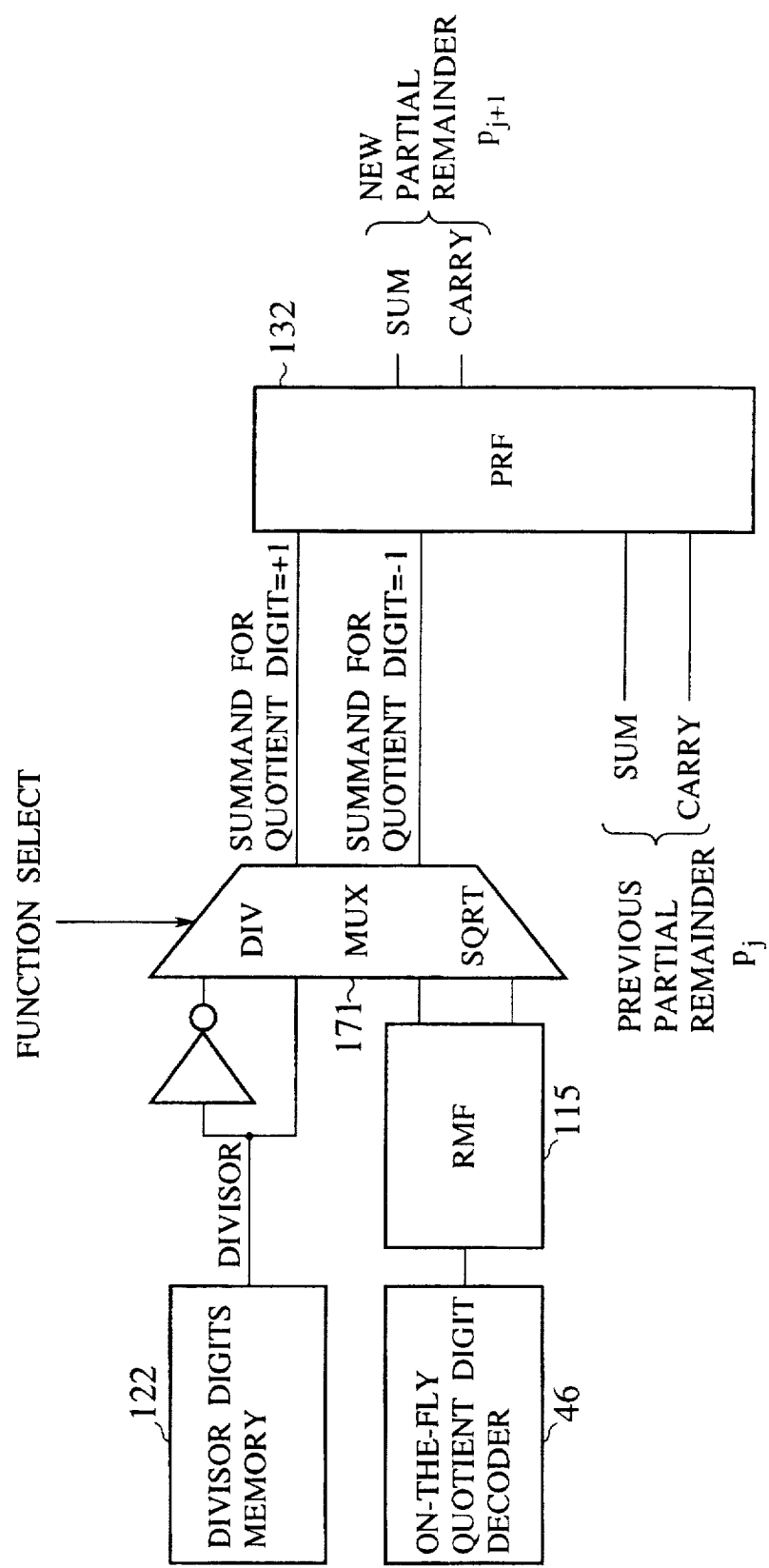
FIG. 29 shows a square root and division calculation unit according to an eighth embodiment of the present invention.

FIG. 29 shows a calculation unit having division and square root functions according to the eighth embodiment of the present invention. This unit has an on-the-fly quotient digit decoder 46, a root multiple formation block (RMF) 115, and a divisor digits memory 122. A selector (MUX) 171 selects root multiples or a divisor as a value to be added to or subtracted from a partial remainder, to thereby calculate a division or square root by sharing hardware. Namely, this embodiment is capable of calculating divisions and square roots with simple hardware at high speed.

The eighth embodiment calculates divisions and square roots by sharing a quotient selection logic (QSL) and a quotient digit determination block including elements such as a 3-bit adder 101 and OR gates 102 and 162 of FIGS. 7 and 19. The difference between a division and a square root is only data to be added to or subtracted from a partial remainder. Accordingly, the selector 171 selects data depending on a calculation, to thereby share hardware for both division and square root. A signed quotient digit produced by an iteration operation is in a redundant form, which is changed into a nonredundant form with a small quantity of hardware. Similarly, root multiples necessary for a square root calculation are generated with a small quantity of hardware. Consequently, the calculation unit of the eighth embodiment is realized by a small quantity of hardware.

[Ninth embodiment]

Figure 30:
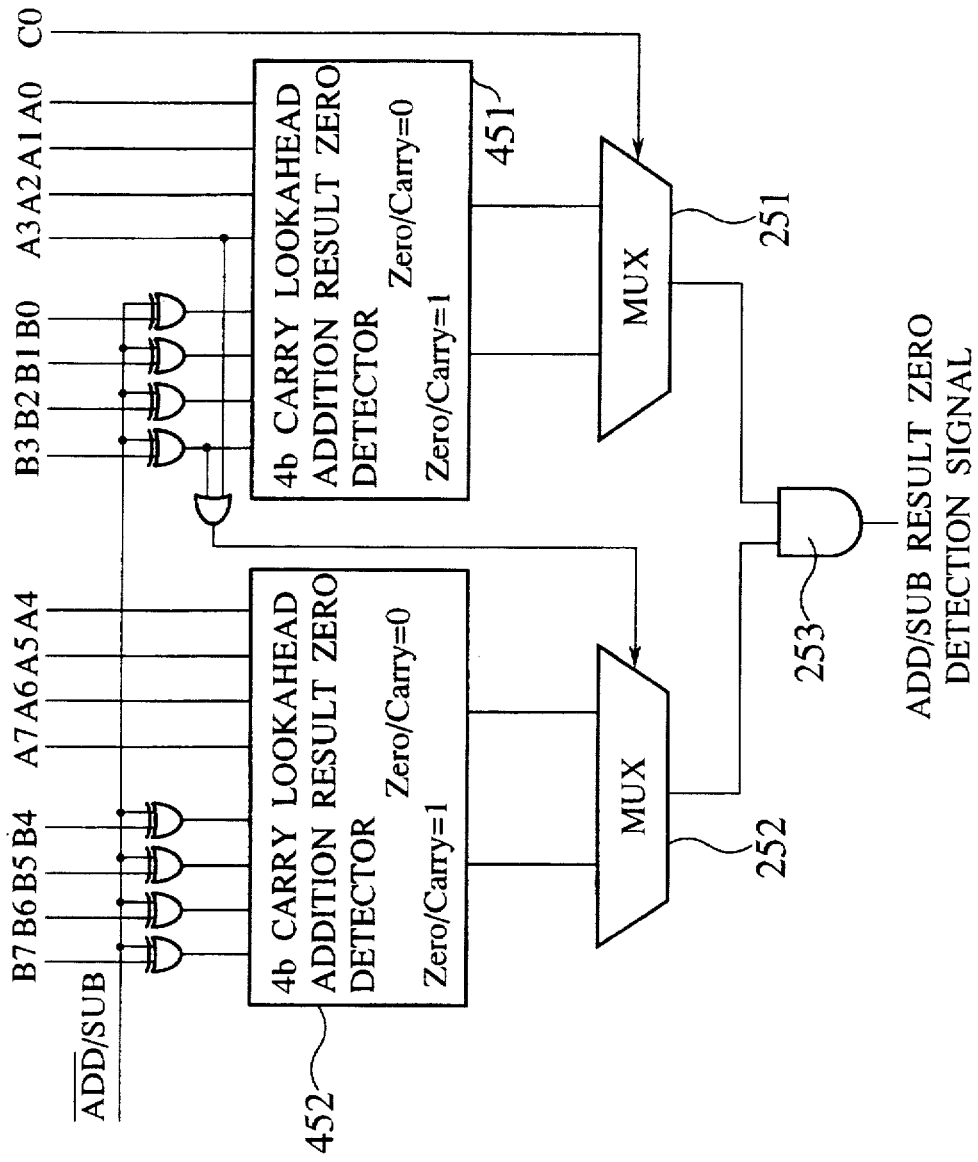
FIG. 30 shows an 8-bit addition/subtraction result zero detector employing a 4-bit carry-look-ahead addition result zero detector, according to a ninth embodiment of the present invention.

FIG. 30 shows a calculation unit according to the ninth embodiment of the present invention. This embodiment divides two pieces of data into blocks each having at least two bits, and carries out a result zero determination after an addition or subtraction. Four-bit carry-look-ahead addition result zero detectors 451 and 452 output two kinds of signal, with the result by the addition or subtraction of divided data, according to whether or not there is a carry from a lower block. Each of selectors 251 and 252 selects one of the two outputs of a corresponding one of the result zero detectors 451 and 452 according to a carry signal from a lower block. Each of the data blocks is provided with the result zero detector and selector. A final determination unit 253 provides the OR or AND of the outputs of the selectors 251 and 252, to provide a final result zero detection signal for the added or subtracted two pieces of data according to the positive or negative value of the output logic by the selector.

Figure 2:
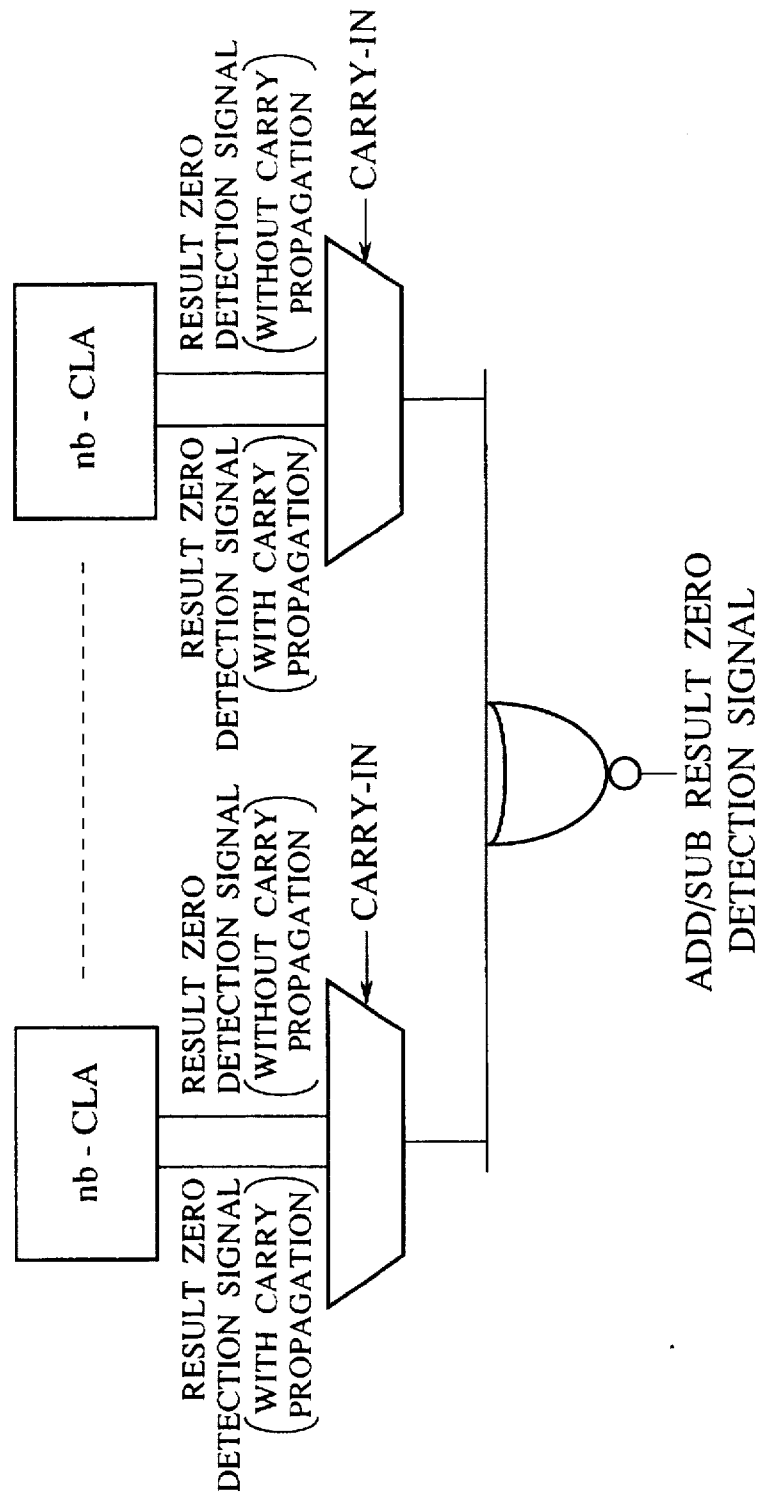
FIG. 2 shows a result zero detector for addition/subtraction, employing a carry and provided for each CLA according to a prior art.
Figure 31:
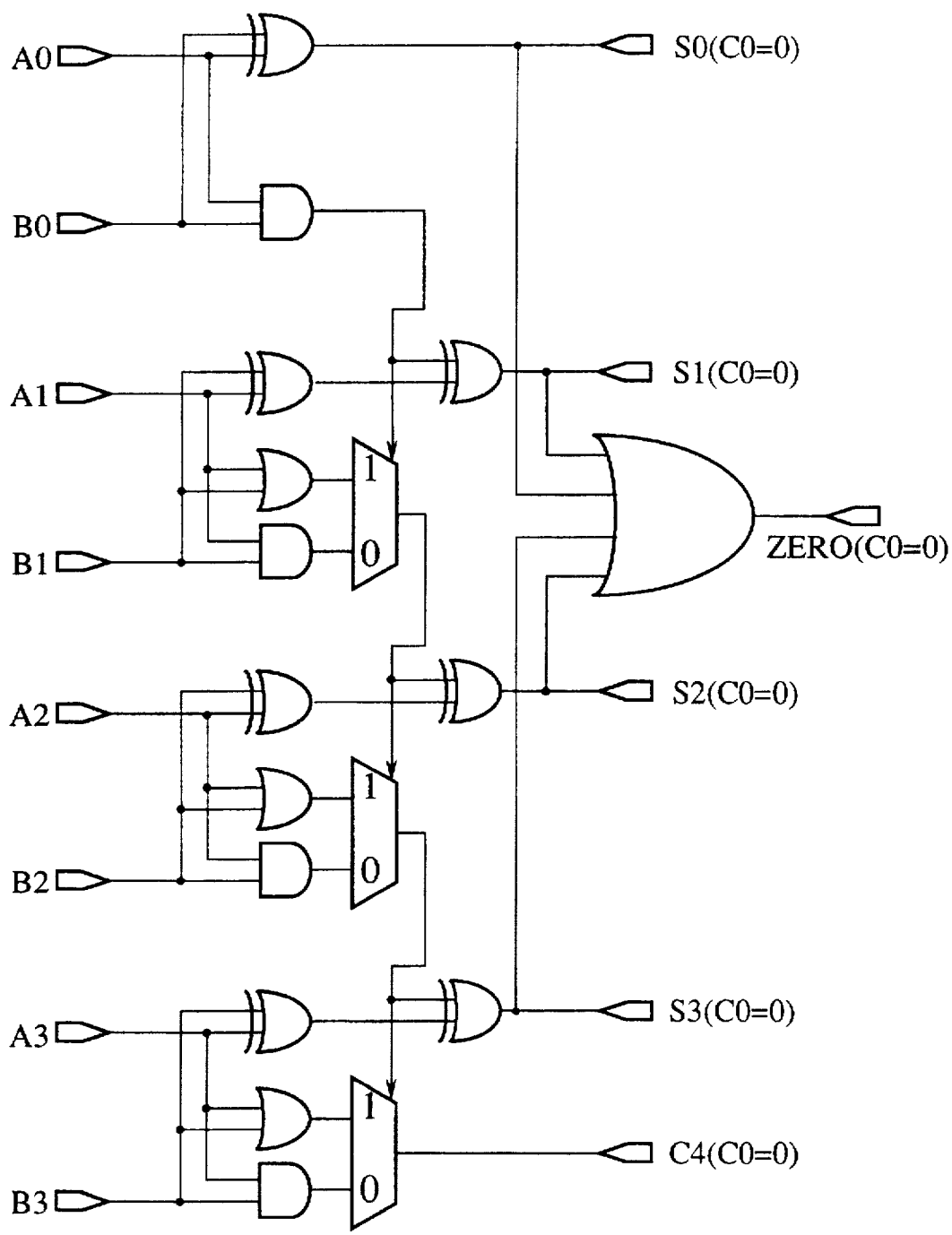
FIG. 31 shows a 4-bit carry-look-ahead addition result zero detector (with carry 0) that is a combination of a 4-bit carry-look-ahead adder and a carry-look-ahead addition result zero detector, according to the ninth embodiment.
Figure 32:
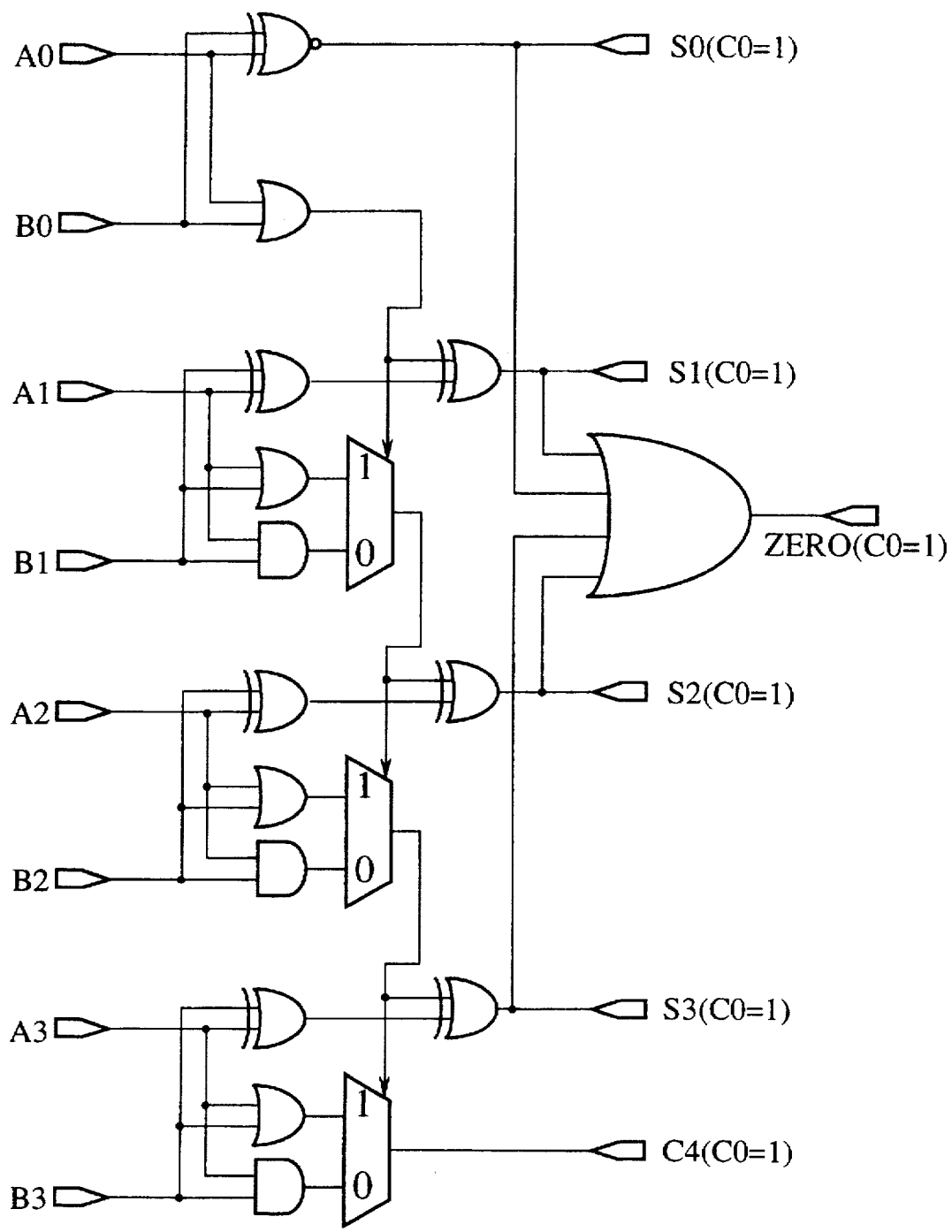
FIG. 32 shows a 4-bit carry-look-ahead addition result zero detector (with carry 1) that is a combination of a 4-bit carry-look-ahead adder and a carry-look-ahead addition result zero detector, according to the ninth embodiment.
Figure 33:
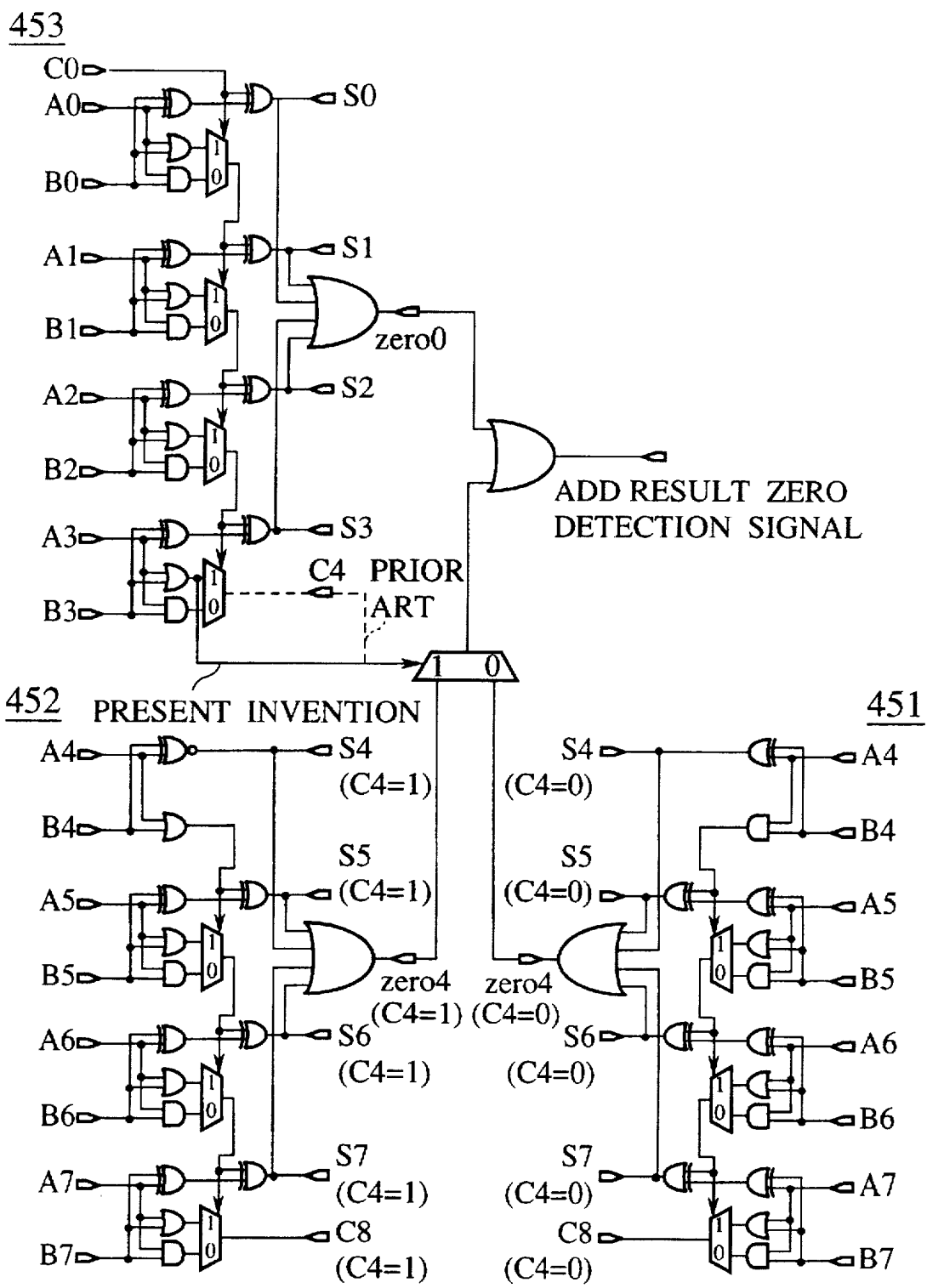
FIG. 33 shows an 8-bit addition result zero detector (a continuous line) that is a combination of the 4-bit carry-look-ahead addition result zero detectors of FIGS. 31 and 32, and a prior art (a dotted line)

The circuit of FIG. 30 divides two pieces of 8-bit input data A and B to be added or subtracted into 4-bit blocks and carries out a result zero detection. To carry out a subtraction, exclusive OR (XOR) gates are arranged to provide the exclusive OR of an add/sub selection signal and each bit of the data B. Each of the result zero detectors 451 and 452 provides an output prepared on the assumption that there is carry from a lower block as well as an output prepared on the assumption that there is no carry from the lower block. One of the outputs is selected by the selector 251 or 252 in response to a carry signal from a lower block. At this time, the higher selector 252 employs, instead of a carry signal from a lower block, the OR of the bits A3 and B3 of the lower block. On the other hand, the lower selector 251 employs a carry input as it is when selecting one of the outputs of the result zero detector 451. If a logical value of 1 is employed to indicate that the result of an addition or subtraction is 0, the AND of the outputs of the selectors 251 and 252 provides a final result zero detection signal. Even if a carry signal to the selector 251 of the lowest block is behind the data A and B, the ninth embodiment is capable of estimating result zero detection outputs before the carry signal is supplied, to thereby prevent the carry signal from entering a critical path. Even if the higher and lower 4-bit blocks are spaced apart from each other due to structural conditions, the ninth embodiment provides the OR of the bits A3 and B3 and prepares result zero detection outputs with assumed carry signals while transferring the OR of the bits A3 and B3 to the higher 4-bit block. FIGS. 31 and 32 show examples of the result zero detectors 451 and 452 of FIG. 30. Each of these detectors consists of a 4-bit adder employing assumed carry signals and a 4-input OR gate for result zero determination. FIG. 33 shows an 8-bit addition result zero detector employing the 4-bit result zero detectors 451, 452 and 453. The prior art of FIG. 2 selects one of the result zero outputs of a given 4-bit block according to a carry from a lower 4-bit block. This prior art is indicated with a dotted line in FIG. 33. On the other hand, the ninth embodiment selects one of the outputs of a given 4-bit block according to the OR of MSBs of a lower 4-bit block as indicated with a continuous line in FIG. 33. As shown in FIG. 33, the OR of MSBs of the lower 4-bit block is produced before a carry C4 is determined. Accordingly, the ninth embodiment is capable of providing a result zero signal quickly.

If a block "n−1," which is lower than a block n, provides an estimated carry signal of 1 according to the ninth embodiment and if the result of an addition/subtraction in the block n−1 is 0, a carry always occurs. Accordingly, the estimated carry signal is usable instead of the carry signal. This will be explained in detail. If one of the MSBs of the block n−1 is 1 and the other is 0, the result of an addition in the block n−1 will be 0 only if a carry to the MSBs occurs in the block n−1 to make the sum of the MSBs 0. In this case, the block n−1 provides a carry. If the MSBs of the block n−1 are each 1, a carry automatically occurs. If the OR of the MSBs of the block n−1 is 0, no carry occurs without regard to an operation result in the block n−1. Accordingly, the estimated carry signal, i.e., the OR of MSBs is usable instead of a carry signal. The estimated carry signal is correct only when the result of an addition/subtraction in the block n−1 is 0. In other cases, the estimated carry signal from the block n−1 may be incorrect. Then, a result zero detection signal provided by the higher block n may be incorrect.

When a block m is the lowest block, it receives an external carry signal and uses the same to generate a zero detection signal $Z_m$ of the block m. This signal $Z_m$ is correct because it is produced according to the correct external carry signal. Thereafter, the next block m+1 provides a zero detection signal $Z_{m+1}$. The AND (OR) of the signals $Z_{m+1}$ and $Z_m$ is also correct because the signal $Z_m$ is correct. In this way, the correct signals are summed up to provide a final zero detection signal that is correct. If the result of a calculation in the lowest block is assured to be zero, higher blocks provide correct zero detection signals. Consequently, a correct addition/subtraction result zero detection is made.

[Tenth embodiment]

Figure 34:
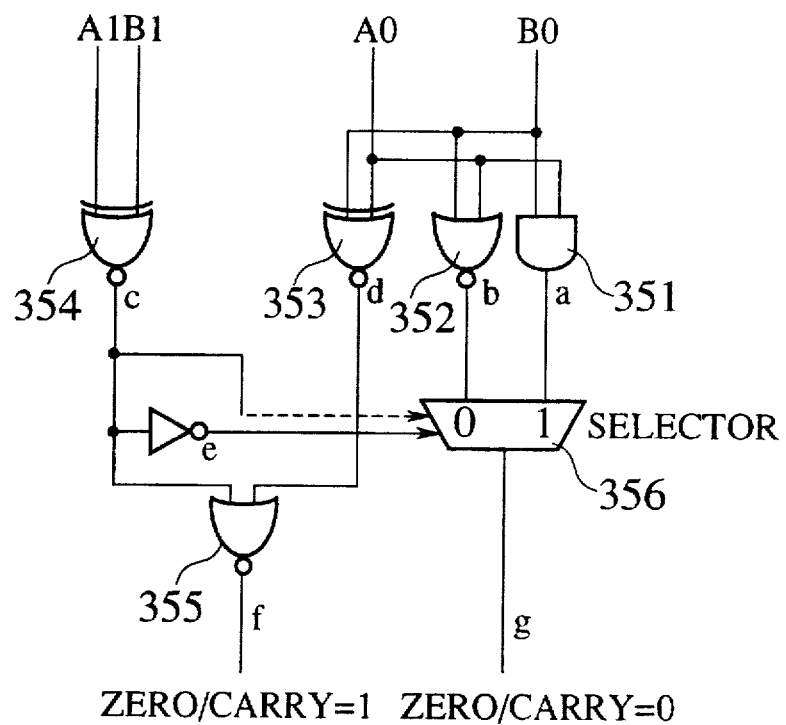
FIG. 34 shows a 2-bit carry-look-ahead addition result zero detector according to a 10th embodiment of the present invention.

FIG. 34 is a block diagram showing a result zero detector according to the 10th embodiment of the present invention. In a given block, a AND gate 351 provides the AND of given bits of two pieces of data supplied to the block. A first NOR gate 352 provides the NOR of the same bits. A first exclusive NOR (XNOR) gate 353 provides the NOT of exclusive OR of the same bits. A second XNOR gate 354 provides the NOT of exclusive OR of higher bits of the given bits. A second NOR gate 355 provides the NOR of the outputs of the first and second XNOR gates 353 and 354. A selector 356 selects one of the outputs of the AND gate 351 and first NOR gate 352 according to the output of the second XNOR gate 354. The output "g" of the selector 356 is a result zero detection signal without carry. The output f of the second NOR gate 355 is a result zero detection signal with carry.

Figure 3:
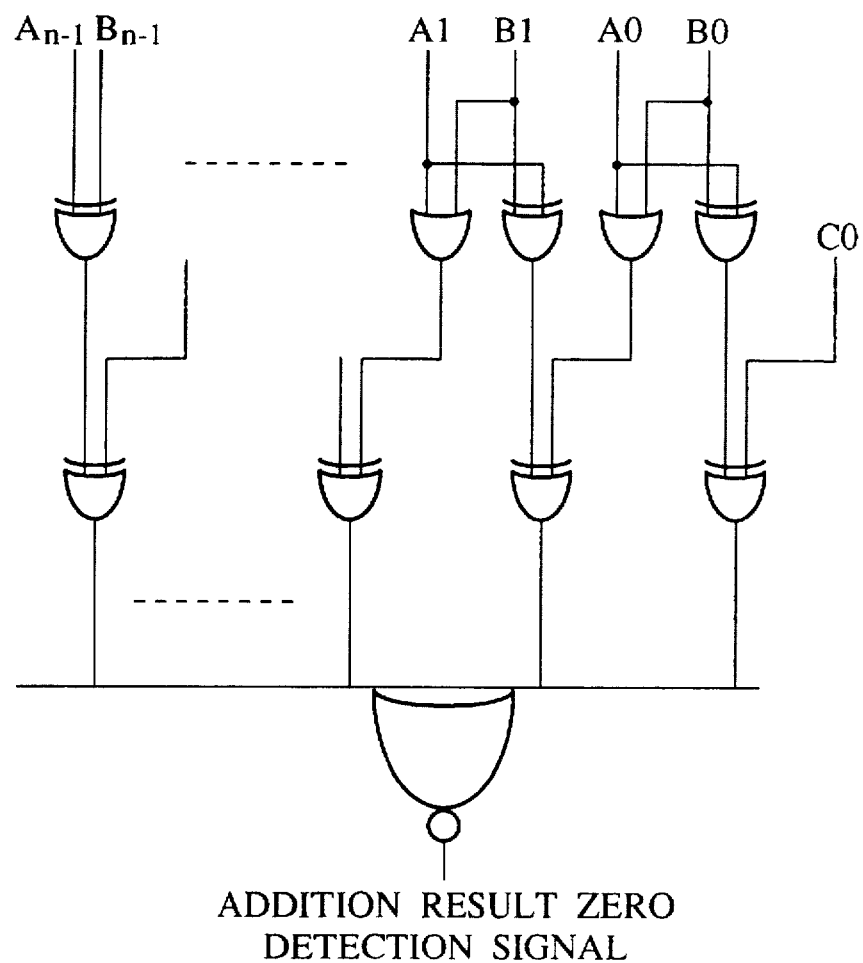
FIG. 3 shows a result zero detector for addition, without employing chained carries according to a prior art.
Figure 35:
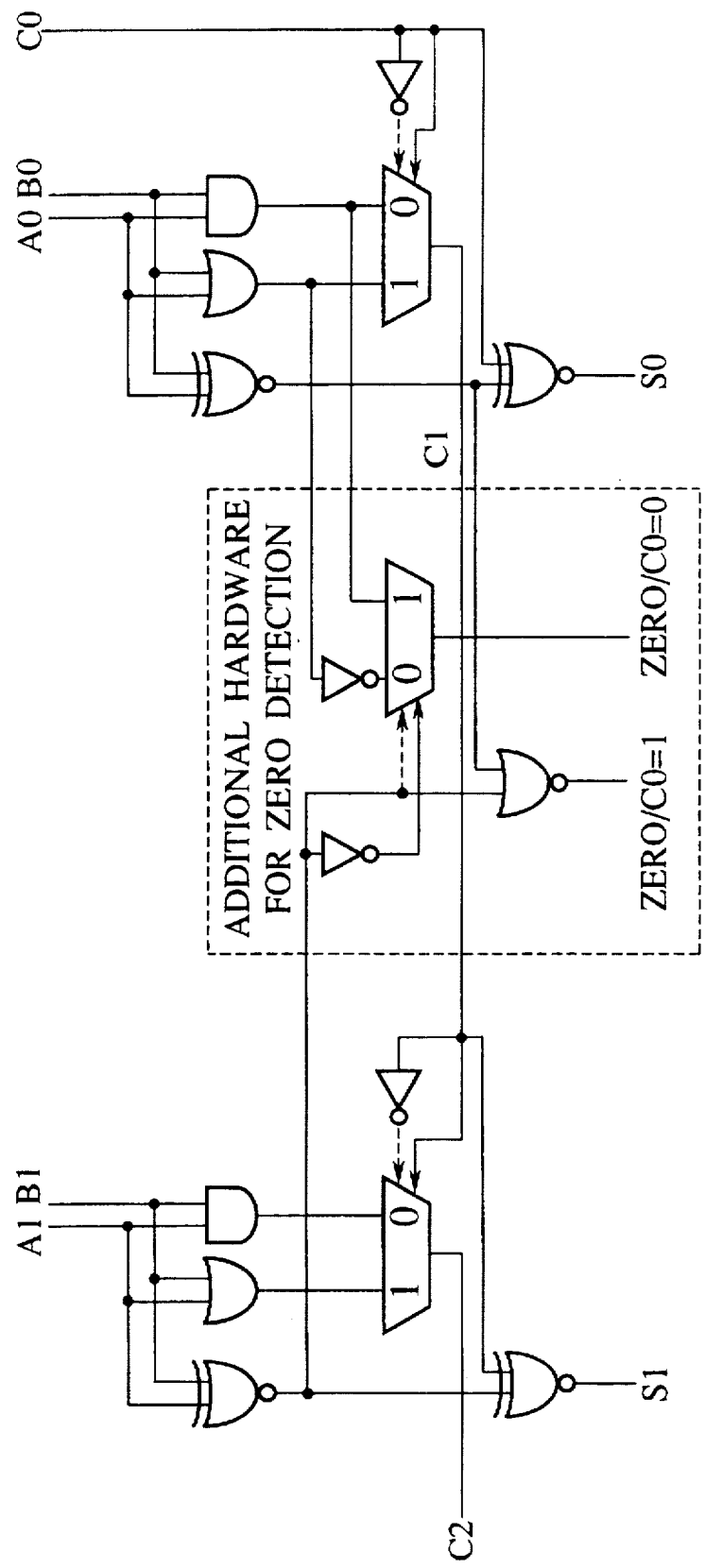
FIG. 35 shows a combination of the 2-bit carry-look-ahead addition result zero detector of the 10th embodiment and a 2-bit adder.
Figure 36:
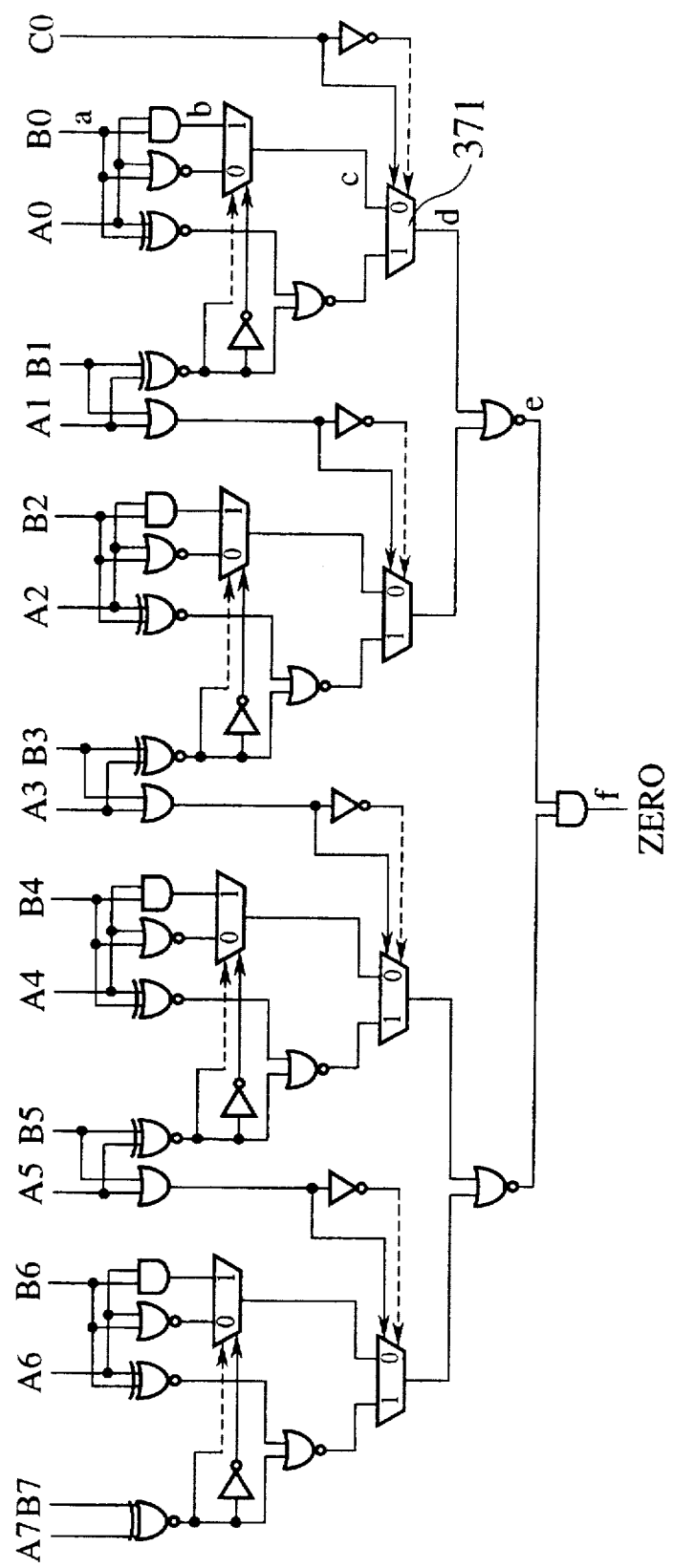
FIG. 36 shows an 8-bit addition result zero detector employing the 2-bit carry-look-ahead addition result zero detectors of FIG. 34.

In FIG. 34, two pieces of data A and B to be added to each other include higher bits A1 and B1 and lower bits A0 and B0. The AND of the bits A0 and B0 is "a" and the NOR thereof is "b." One of the a and b is selected according to the XNOR of the bits A1 and B1. If "e" is 1, the selector 356 selects the output a on the "1" side as the output g. If the e is 0, the selector 356 selects the output b on the "0" side as the output g. The output g is the result zero detection signal of the addition carried out in this block when there is no carry from a lower block. When the result of the addition is zero, the output g is 1. The output f will be the result zero detection signal if there is carry from the lower block. Compared with the prior art of FIG. 3, the circuit of FIG. 34 has the same number of stages but has no cascaded exclusive OR (XOR) gates. Accordingly, the circuit of FIG. 34 realizes a high-speed operation. The amount of hardware components of FIG. 34 is substantially the same as that of FIG. 3 except the NOR and AND gates for lower bits. Namely, an increase in the quantity of hardware of FIG. 34 is moderate. FIG. 35 shows a 2-bit adder provided with the circuit of FIG. 34. The components encircled with a dotted line is additional hardware elements due to the result zero detector. A large part of the additional hardware is shared by elements of the original adder. FIG. 36 shows an 8-bit result zero detector for addition employing the 2-bit detectors of FIG. 34. A result zero detection signal of a given 2-bit block is selected according to the OR of MSBs of a lower block or a carry C0. The AND of the outputs of the blocks provides a final result zero detection signal. Before the carry C0 is supplied to a selector 371, signals from bits A0 and B0 pass through routes a, b, and c shown in FIG. 36. Accordingly, the signals are behind the carry C0 by two logic stages. On the other hand, the prior art of FIG. 3 provides only a temporal margin of one logic stage. Accordingly, if the carry C0 causes even a small delay, it will influence the total operation speed of the prior art. The carry C0 frequently delays in an arithmetic and logic unit (ALU) of a standard microprocessor. The lowest stage of an adder/subtracter usually employs a carry lookahead adder to compensate the delay of the carry C0. The addition/subtraction result zero detector of the 10th embodiment is able to deal with such situation. Although the prior art estimates values by assuming a carry and waits for the carry C0, it requires a delay time corresponding to a selector. On the other hand, the 2-bit block circuit of the 10th embodiment is capable of dealing with the delay of the carry C0 without increasing the number of logic stages.

[Eleventh embodiment]

Figure 37:
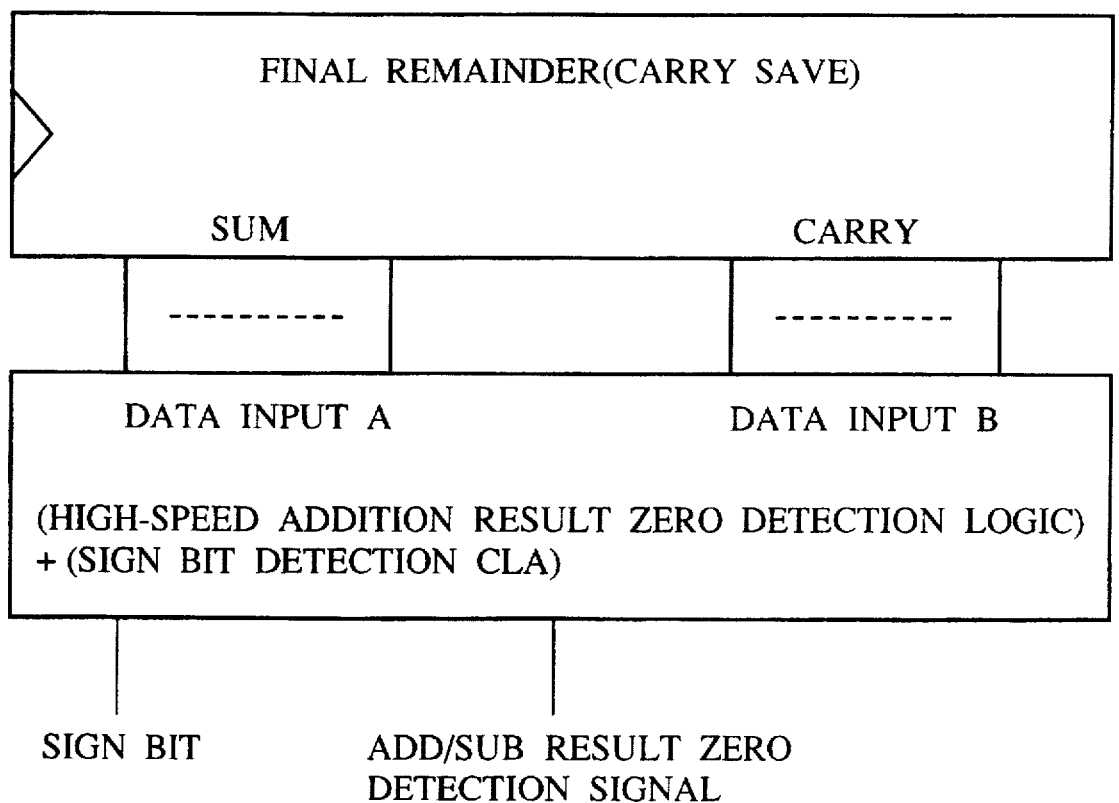
FIG. 37 shows a final reminder adder of an unrecoverable floating point divider according to an 11th embodiment of the present invention.

FIG. 37 shows a remainder final adder of a floating point divider employing a high-speed addition result zero detector, according to the 11th embodiment of the present invention. A remainder final adder of a nonrestoring divider must determine the sign of a remainder as well as whether or not it is zero, to realize correct rounding. For this purpose, the prior art employs the arrangement of FIG. 1 to carry out additions and calculates the OR of results of the additions to determine whether or not a final result is 0. Namely, the prior art employs the sign bit of the sum to determine the value of a remainder. The prior art of FIG. 1 must completely calculate additions that are not essentially required for result zero detection. Only after receiving the results of the additions, the prior art starts to determine whether or not the sum is 0. In this way, the prior art needs hardware to calculate additions, to increase a delay time. On the other hand, the 11th embodiment of FIG. 37 employs the high-speed result zero detection logic in addition to adders that are capable of determining only sign bits. Accordingly, the 11th embodiment achieves a high-speed operation with a small quantity of hardware.

This technique is applicable to the result zero detection of a final remainder of a floating point square root calculation unit.

Various modifications will become possible for those skilled in the art after receiving the teachings of the present disclosure without departing from the scope thereof.

What is claimed is:

1. A calculation unit having at least a quotient selection logic, for calculating a division or square root according to an iteration algorithm with a partial remainder expressed with the sum of a sum digit and carry digit, the quotient selection logic comprising:
   (a) an adder for adding higher three bits of the sum digit to higher three bits of the carry digit;
   (b) OR means for providing the OR of the fourth bits of the sum and carry digits; and
   (c) quotient digit determination means for determining a next quotient digit according to the outputs of said adder and OR means.

2. A calculation unit as claimed in claim 1, wherein the quotient digit determination means comprising:
   (i) a sign generator for determining the sign of the quotient digit according to the most significant bit of the output of said adder; and
   (ii) an absolute value generator for determining the absolute value of the quotient digit as 0 if each bit of the 3-bit output of said adder is 1, or if each bit of thereof is 0 and the output of said OR means is 0, and as 1 in the other cases.

3. A calculation unit having at least square root arithmetic data generation means, for calculating a square root according to an iteration algorithm with a quotient digit of redundant form, the square root arithmetic data generation means comprising:
   (a) a bit position indicator for storing the position of a bit where a quotient digit is calculated;
   (b) a first quotient digits memory for storing a quotient digit set of nonredundant form prepared on the assumption that there is carry propagation from a lower position;
   (c) a second quotient digits memory for storing a quotient digit set of nonredundant form prepared on the assumption that there is no carry propagation from the lower position;
   (d) root multiple formation means for generating root multiples used for calculating the square root, according to the outputs of said bit position indicator and said first and second quotient digits memories; and
   (e) on-the-fly digit handling means for generating a quotient digit set with carry propagation and a quotient digit set without carry propagation according to the outputs of said bit position indicator and said first and second quotient digits memories as well as a next quotient digit to be obtained.

4. A calculation unit as claimed in claim 3, wherein said root multiple formation means puts restricting conditions on an indication provided by said bit position indicator when generating root multiples according to the outputs of said bit position indicator and said first and second quotient digits memories.

5. A calculation unit for calculating a square root according to an iteration algorithm with a partial remainder expressed with the sum of a sum digit and carry digit, comprising:
   (a) a partial remainder memory for storing the sum and carry digits;
   (b) a quotient selection logic having an adder for adding higher three bits of the sum digit to higher three bits of the carry digit, OR means for providing the OR of the fourth bits of the sum and carry digits, and quotient digit determination means for determining a next quotient digit according to the outputs of said adder and OR means;
   (c) square root arithmetic data generation means having a bit position indicator for storing the position of a bit where a quotient digit is calculated, a first quotient digits memory for storing a quotient digit set of nonredundant form prepared on the assumption that there is carry propagation from a lower position, a second quotient digits memory for storing a quotient digit set of nonredundant form prepared on the assumption that there is no carry propagation from the lower position, root multiple formation means for generating root multiples used for calculating the square root, according to the outputs of the bit position indicator and the first and second quotient digits memories, and on-the-fly digit handling means for generating a quotient digit set with carry propagation and a quotient digit set without carry propagation according to the outputs of the bit position indicator and the first and second quotient digits memories as well as the next quotient digit;
   (d) selection means for selecting one of the outputs of said square root arithmetic data generation means according to the quotient digit provided by said quotient selection logic, to provide data to be added to or subtracted from the partial remainder; and
   (e) a carry save adder for carrying out a calculation on the data provided by said selection means and the partial remainder stored in said partial remainder memory according to an addition/subtraction instruction from the quotient selection logic, and providing the output thereof to said partial remainder memory.

6. A calculation unit for calculating a square root and a division according to an iteration algorithm with a partial remainder expressed with the sum of a sum digit and carry digit, comprising:
   (a) a partial remainder memory for storing the sum and carry digits;
   (b) a quotient selection logic having an adder for adding higher three bits of the sum digit to higher three bits of the carry digit, OR means for providing the OR of the fourth bits of the sum and carry digits, and quotient digit determination means for determining a next quotient digit according to the outputs of the adder and OR means;
   (c) square root arithmetic data generation means having a bit position indicator for storing the position of a bit where a quotient digit is calculated, a first quotient digits memory for storing a quotient digit set of nonredundant form prepared on the assumption that there is carry propagation from a lower position, a second quotient digits memory for storing a quotient digit set of nonredundant form prepared on the assumption that there is no carry propagation from the lower position, root multiple formation means for generating root multiples used for calculating the square root, according to the outputs of the bit position indicator and the first and second quotient digits memories, and on-the-fly digit handling means for generating quotient digit sets according to the outputs of the bit position indicator and the first and second quotient digits memories;
   (d) a divisor digits memory for storing a divisor digit;
   (e) a division/square root selection means for selecting one of the outputs of the root multiple formation means and divisor digits memory;
   (f) summand selection means for selecting one of the outputs of said division/square root selection means according to the quotient digit provided by said quotient selection logic, to provide data to be added to or subtracted from the partial remainder; and (g) a carry save adder for carrying out a calculation on the data provided by said summand selection means and the partial remainder stored in said partial remainder memory according to an addition/subtraction instruction from the quotient selection logic, and providing the output hereof to said partial remainder memory.

7. A calculation unit for calculating a square root according to an iteration algorithm with a partial remainder expressed with the sum of a sum digit and carry digit, comprising:

(a) square root arithmetic data generation means having a bit position indicator for storing the position of a bit where a quotient digit is calculated, a first quotient digits memory for storing a quotient digit set of nonredundant form prepared on the assumption that there is carry propagation from a lower position, a second quotient digits memory for storing a quotient digit set of nonredundant form prepared on the assumption that there is no carry propagation from the lower position, root multiple formation means for generating root multiples used for calculating the square root, according to the outputs of the bit position indicator and the first and second quotient digits memories, and on-the-fly digit handling means for generating quotient digit sets according to the outputs of the bit position indicator and quotient digits memories;

(b) overlap execution means for estimating next partial remainders according to the output of said square root arithmetic data generation means and assumed quotient digits;

(c) a selector for selecting one of the estimated partial remainders of said overlap execution means according to a determined quotient digit;

(d) a quotient selection logic for selecting a quotient digit according to the selected partial remainder; and (e) partial remainder formation means for calculating a next partial remainder.

8. A calculation unit as claimed in claim 7, further comprising a divisor digits memory.

9. A calculation unit as claimed in claim 7, wherein at least said partial remainder formation means, selector, quotient selection logic, square root arithmetic data generation means, and overlap execution block form a propagation range, and a plurality of said propagation ranges are cascaded one after another, and the calculation unit further comprises:

(a) a completion signal generator for detecting the completion of the operation of at least one of said partial remainder formation means, quotient selection logic, and on-the-fly digit handling means of the second propagation range arranged just after the first propagating range, and providing a completion signal;

(b) setup/reset means for setting up and resetting the first propagation range in response to the completion signal from the second propagation range; and (c) setup signal generator for supplying a setup signal to the setup/reset means.

10. A calculation unit having at least a quotient selection logic, for calculating a division or square root according to a radix 2 iteration algorithm with a partial remainder expressed with the sum of a sum digit and carry digit, the quotient selection logic comprising:

(a) an adder for adding higher three bits of the sum digit to higher three bits of the carry digit, to provide an output consisting of bits D0, D1, and D2;

(b) OR means for providing the OR of the LSB (least significant bit) of the output of said adder and fourth bits of the sum and carry digits; and (c) quotient digit determination means for determining the next quotient digit according to the outputs of said adder and OR means.

11. A calculation unit as claimed in claim 10, wherein said quotient digit determination means provides a quotient digit of 0 if each of the bits D0, D1, and D2 is 1 or each of the bits D0, D1, and D3 is 0, a quotient digit of +1 if the bit D0 is 0 and one of the bits D1 and D3 is 1, and a quotient digit of −1 if the bit D0 is 1 and one of the bits D1 and D2 is 0.

12. A calculation unit as claimed in claim 10, wherein said quotient digit determination means comprising:

(a) a sign generator for providing a sign of "+" if the bit D0 is 0 and a sign of "−" if the bit D0 is 1; and (b) an absolute value generator for determining the absolute value of the quotient digit as 0 if each of the bits D0, D1, and D3 is 0 or each of the bits D0, D1, and D2 is 1, and as 1 in the other cases.

13. A calculation unit having a predetermined number (at least two) of on-the-fly quotient digit decoders, for calculating a division or square root according to an iteration algorithm with a quotient digit being converted from redundant form into nonredundant form, each of the on-the-fly quotient digit decoders comprising:

(a) a bit position indicator for storing the position of a bit where a quotient digit is calculated;

(b) a first quotient digits memory for storing a quotient digit set of nonredundant form prepared on the assumption that there is carry propagation;

(c) a second quotient digits memory for storing a quotient digit set of nonredundant form prepared on the assumption that there is no carry propagation; and (d) on-the-fly digit handling means for generating quotient digit sets to provide a next quotient digit, the calculation unit providing a quotient digit of at least two bits in one operation.

14. A calculation unit as claimed in claim 13, each of said on-the-fly quotient digit decoders further comprising root multiple formation means for generating root multiples according to the outputs of said bit position indicator and first and second quotient digits memories, said on-the-fly quotient digit decoder and root multiple formation means forming square root arithmetic data generation means, the predetermined number of the square root arithmetic data generation means being cascaded one after another.

15. A calculation unit as claimed in claim 14, further comprising:

(a) overlap execution means for estimating next partial remainders according to the output of the square root arithmetic data generation means and assumed quotient digits;

(b) a first selector for selecting one of the outputs of the overlap execution means; and (c) a quotient selection logic for selecting a quotient digit according to the output of the first selector.

16. A calculation unit as claimed in claim 15, further comprising a second selector for selecting the root multiples or a divisor digits, to calculate a square root or division by sharing hardware.

* * * * *